US012459585B2

(12) United States Patent
DeLizo et al.

(10) Patent No.: US 12,459,585 B2
(45) Date of Patent: Nov. 4, 2025

(54) MECHANIZED GLADHAND

(71) Applicant: PACCAR Inc, Bellevue, WA (US)

(72) Inventors: Stan DeLizo, Lynnwood, WA (US);
Yen-Lin Han, Seattle, WA (US); Brian Celustka, Mill Creek, WA (US);
Eenseung Kwak, Auburn, WA (US);
Charles Lyford, Bellevue, WA (US);
Mark Taylor, Bellevue, WA (US)

(73) Assignee: PACCAR, Inc, Bellevue, WA (US)

( * ) Notice: Subject to any disclaimer, the term of this patent is extended or adjusted under 35 U.S.C. 154(b) by 654 days.

(21) Appl. No.: 17/339,733

(22) Filed: Jun. 4, 2021

(65) Prior Publication Data

US 2021/0380182 A1    Dec. 9, 2021

Related U.S. Application Data

(60) Provisional application No. 63/035,089, filed on Jun. 5, 2020.

(51) Int. Cl.
*B62D 53/12* (2006.01)
*B25J 9/16* (2006.01)
(Continued)

(52) U.S. Cl.
CPC .......... *B62D 53/125* (2013.01); *B25J 9/1612* (2013.01); *B25J 9/163* (2013.01); *B25J 9/1664* (2013.01);
(Continued)

(58) Field of Classification Search
CPC ....... B62D 53/125; B25J 9/1612; B25J 9/163; B25J 9/1664; B25J 9/1679; B25J 9/1697;
(Continued)

(56) References Cited

U.S. PATENT DOCUMENTS

| | | | |
|---|---|---|---|
| 4,620,362 A | 11/1986 | Reynolds | |
| 5,108,140 A | 4/1992 | Bartholet | |

(Continued)

FOREIGN PATENT DOCUMENTS

| | | |
|---|---|---|
| CN | 103094813 B | 5/2015 |
| CN | 107732569 | 2/2018 |

(Continued)

OTHER PUBLICATIONS

European Partial Search Report in Application 21816699.9, mailed Oct. 17, 2024, 11 pages.

(Continued)

*Primary Examiner* — Adam R Mott
*Assistant Examiner* — Byron Xavier Kasper

(57) ABSTRACT

The present technology describes systems and methods for a mechanized gladhand and an end effector. The mechanized gladhand may have a collar capable of rotational motion while the mating surface may be in contact with a second surface without rotating. This may reduce reaction loads while maintaining the integrity of the connection. The end effector may include a drive motor, clasping tool, and/or driving installed tool that may be used to couple a tool with the gladhand or may be used in other applications. The end effector may have a compact design to allow precise control. The movement of the end effector with the gladhand may be controlled based on image processing to align the tool with another component.

19 Claims, 25 Drawing Sheets

(51) Int. Cl.
  *B25J 15/00* (2006.01)
  *B60D 1/62* (2006.01)
  *B60D 1/64* (2006.01)
  *B60L 53/16* (2019.01)
  *B60L 53/35* (2019.01)
  *F16L 33/28* (2006.01)
  *F16L 37/00* (2006.01)

(52) U.S. Cl.
  CPC ............ *B25J 9/1679* (2013.01); *B25J 9/1697* (2013.01); *B25J 15/0028* (2013.01); *B60D 1/64* (2013.01); *F16L 33/28* (2013.01)

(58) Field of Classification Search
  CPC ... B25J 15/0028; B25J 9/00; B25J 9/16; B25J 11/00; B25J 15/04; B25J 9/1669; B25J 19/021; B60D 1/64; B60D 1/62; B60D 1/36; F16L 33/28; F16L 37/002; H07R 13/629; B60G 2300/044; B60R 1/003; B60T 17/043
  See application file for complete search history.

(56) References Cited

U.S. PATENT DOCUMENTS

| | | | | |
|---|---|---|---|---|
| 7,021,334 | B1* | 4/2006 | Helmer | B60D 1/64 |
| | | | | 280/421 |
| 10,093,189 | B2 | 10/2018 | Sommarstrom | |
| 2010/0307296 | A1* | 12/2010 | Jones | B25B 13/5091 |
| | | | | 81/177.2 |
| 2012/0200078 | A1* | 8/2012 | Puluc | F16L 33/00 |
| | | | | 285/61 |
| 2013/0277943 | A1 | 10/2013 | Wendte | |
| 2018/0001777 | A1 | 1/2018 | Kilic | |
| 2019/0168396 | A1 | 6/2019 | Leidenfrost | |
| 2019/0302764 | A1* | 10/2019 | Smith | B25J 9/1679 |
| 2019/0315320 | A1 | 10/2019 | Maat | |
| 2020/0130582 | A1* | 4/2020 | Wong | B62D 13/06 |
| 2020/0264607 | A1 | 8/2020 | Smith | |
| 2020/0338942 | A1 | 10/2020 | Winograd | |
| 2020/0361096 | A1* | 11/2020 | Duhamel | B25J 15/08 |
| 2021/0053407 | A1 | 2/2021 | Smith et al. | |
| 2021/0379945 | A1 | 12/2021 | DeLizo | |
| 2022/0384990 | A1 | 12/2022 | DeLizo et al. | |

FOREIGN PATENT DOCUMENTS

| | | |
|---|---|---|
| EP | 0983932 | 3/2000 |
| WO | 2017/091433 | 6/2017 |

OTHER PUBLICATIONS

PCT International Preliminary Report on Patentability in International Application PCT/US2021/035231, mailed Dec. 15, 2022, 7 pgs.

Seattle U, Projects day 2019 Event Schedule, accessed online at: https://www.seattleu.edu/media/college-of-science-and-engineering/files/projectcenter/SU_Projects-Day-Book_2019.pdf, 2019, 17 pages.

PCT International Search Report and Written Opinion in International Application PCT/US2021/035231, mailed Sep. 1, 2021, 10 pgs.

European Extended Search Report in Application 21816699.9, mailed Mar. 25, 2025, 11 pages.

* cited by examiner

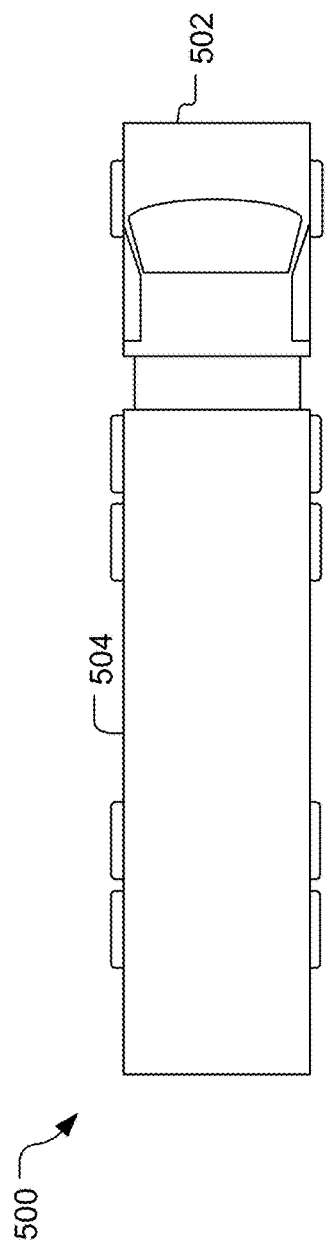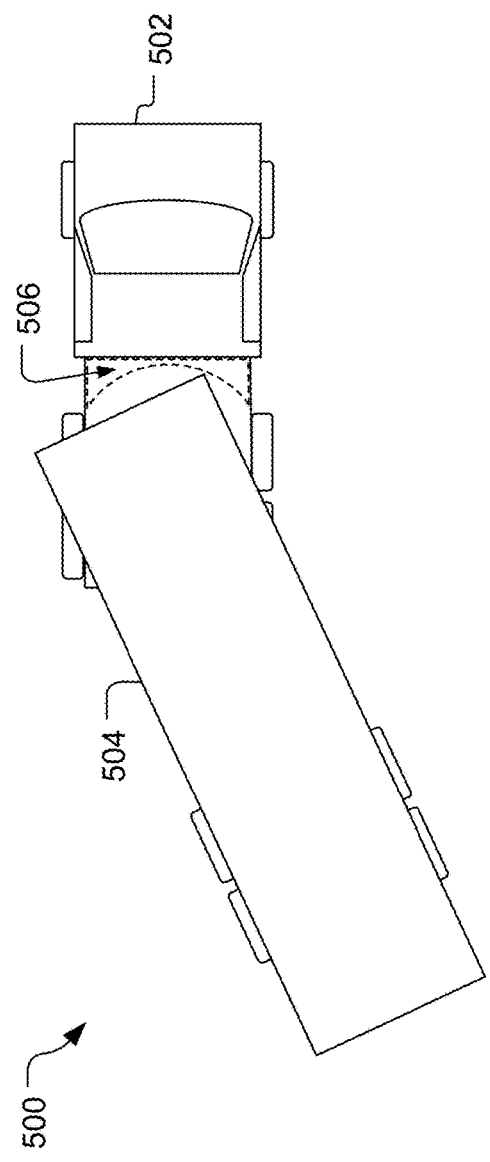
FIG. 5A
FIG. 5B

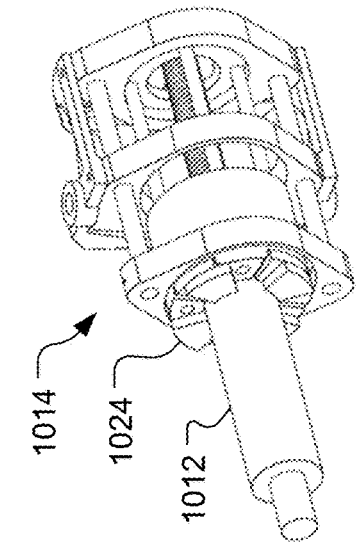
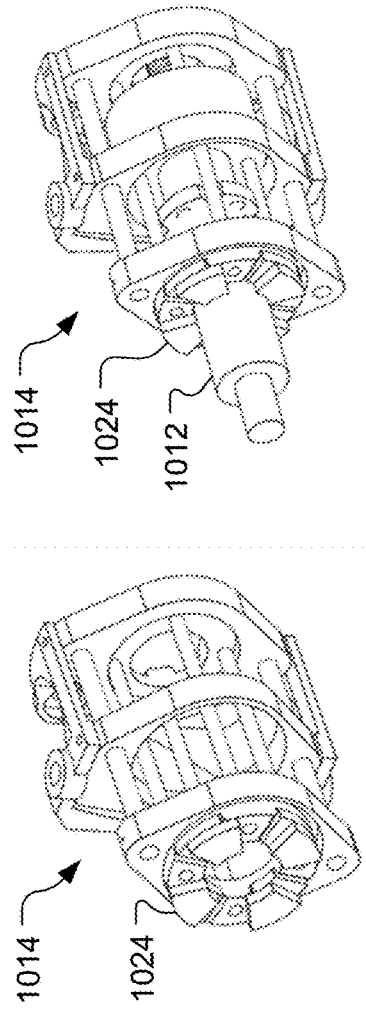
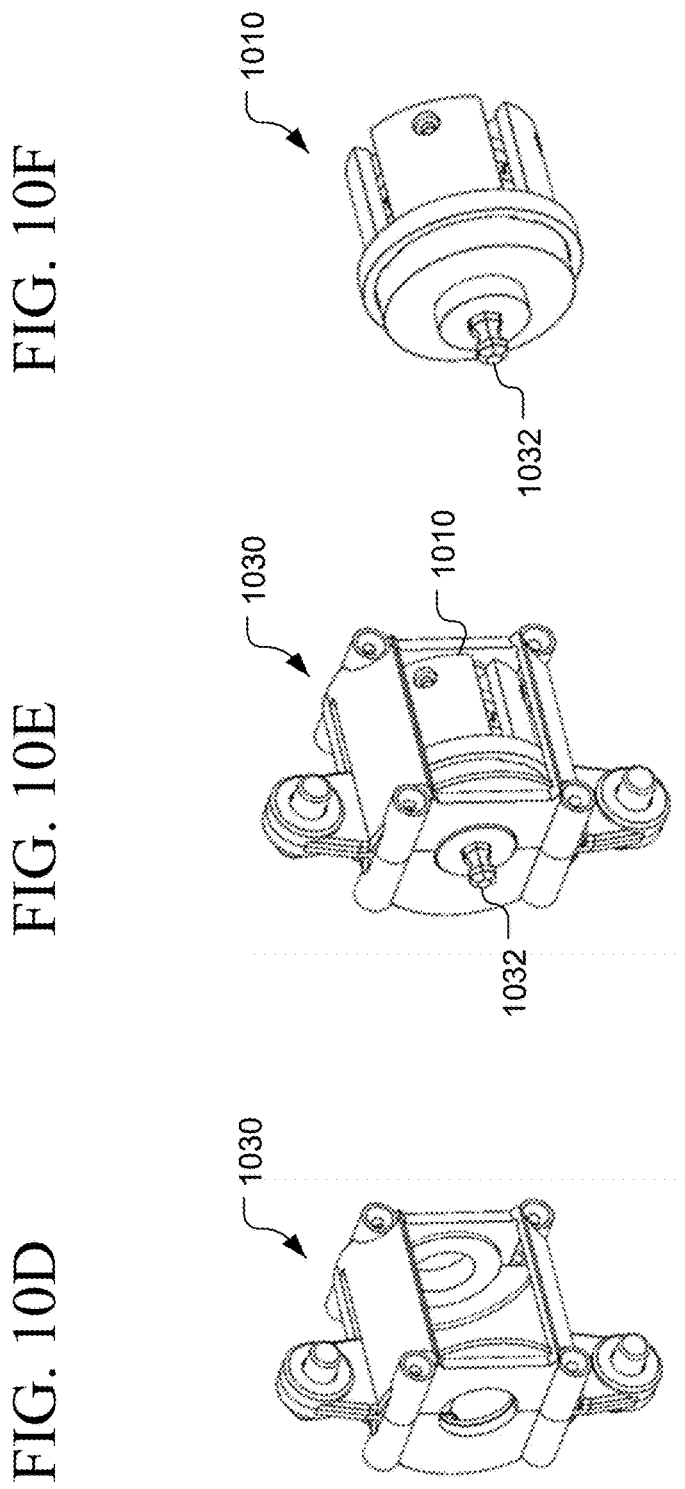

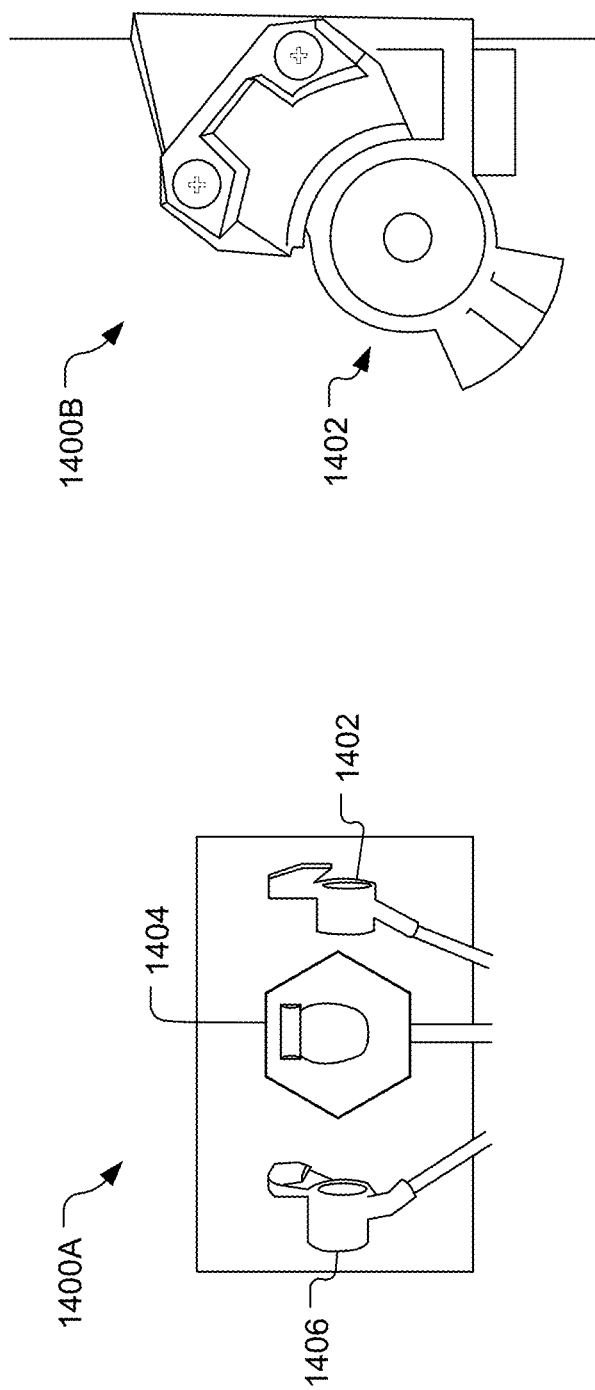

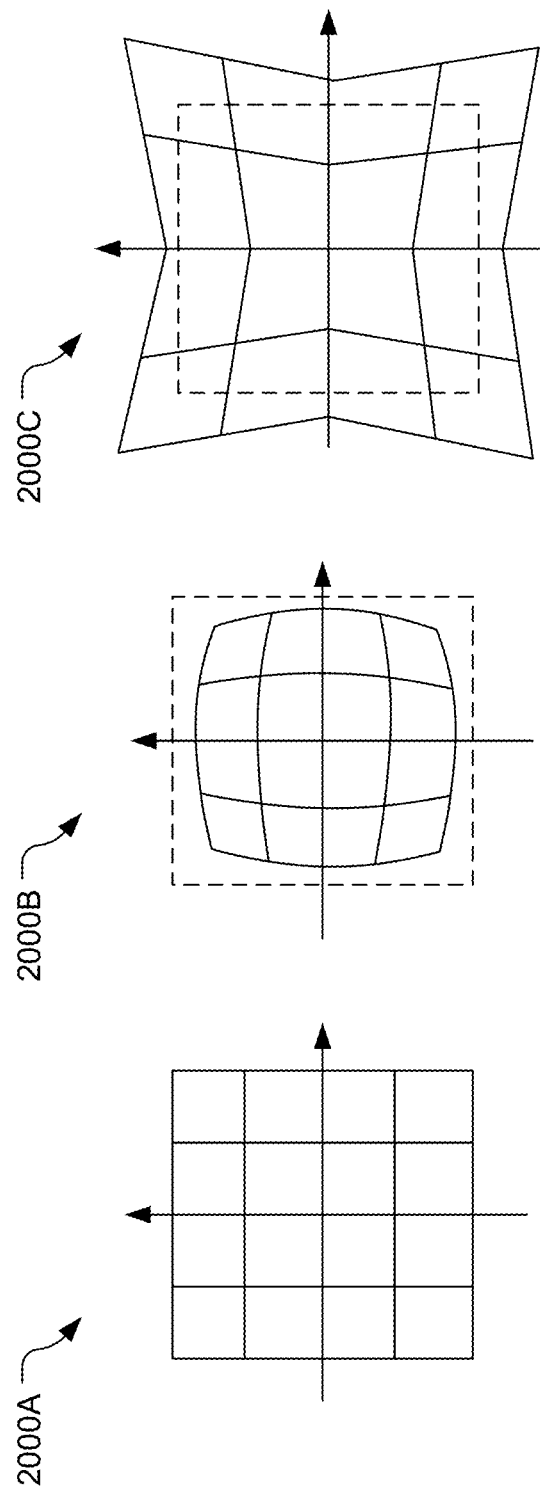

MECHANIZED GLADHAND

CROSS-REFERENCE TO RELATED APPLICATIONS

This application claims the benefit of U.S. Provisional Application No. 63/035,089, filed Jun. 5, 2020, the complete disclosure of which is hereby incorporated herein by reference in its entirety.

BACKGROUND

Vehicles are shifting towards self-automation and self-driving modes. In particular, various aspects of tractor-trailer systems are also being automated. One such process is the connection of tractor-trailer pneumatic and electric lines. Often, each tractor is equipped with a pneumatic hose and an electrical line to be connected prior to vehicle movement.

It is with respect to these and other general considerations that the aspects disclosed herein have been made. Although relatively specific problems may be discussed, it should be understood that the examples should not be limited to solving the specific problems identified in the background or elsewhere in this disclosure.

SUMMARY

The present technology relates to a mechanized gladhand and an end effector. In an aspect, a mechanized gladhand is disclosed. The mechanized gladhand includes a sealing surface; a collar; a plunger; a turret rotatable about the collar and the plunger; and a retention spring applying a threshold force on the plunger and the collar to limit rotation relative to each other.

In an example, the mechanized gladhand further includes a connector plate; and a detent plate. In another example, the connector plate and the detent plate are coupled to the turret to rotate with the turret. In a further example, the turret is coupled to a hose and wherein the hose is coupled to a truck. In yet another example, the hose is fluidly coupled to a duct in the plunger and a port in the sealing surface. In still a further example, the duct in the plunger and the port in the sealing surface are concentric. In another example, the collar includes a connector plate and a detent plate. In a further example, the plunger is retained to the turret on a rotational bearing.

In another aspect, a method for automating a gladhand coupling between a vehicle and a trailer is disclosed. The method includes identifying, by a processor, a trailer mating surface, based on at least one image. Based on the at least one image, the method includes determining a mating position of the trailer mating surface, based on the at least one image. The method also includes positioning an end effector based on the mating position, such that a gladhand mating surface of a gladhand coupled to the end effector is coupled to the trailer mating surface. Additionally, the method includes rotating the end effector and the gladhand relative to the trailer mating surface and the gladhand mating surface, at the mating position. The method further includes decoupling the gladhand from the end effector by opening a clamp of the end effector; and repositioning the end effector.

In an example, the at least one image includes a first image and wherein positioning the end effector is further based on a second image. In another example, the first image is obtained from a first camera and the second image is obtained from a second camera. In a further example, the second camera is coupled to end effector. In yet another example, positioning the end effector includes controlling at least one linear actuator coupled to the end effector. In still a further example, repositioning the end effector includes controlling at least one linear actuator coupled to the end effector. In another example, opening the clamp of the end effector includes moving a traveler along a drive shaft of the end effector.

In a further aspect, a method for automating a gladhand decoupling between a vehicle and a trailer is disclosed. The method includes identifying, by a processor, a gladhand with a gladhand mating surface coupled to a trailer mating surface, based on at least one image. Based on the at least one image, the method includes determining a mating position of a gladhand coupled to the trailer mating surface. The method also includes positioning an end effector based on the mating position, such that the end effector becomes coupled to the gladhand. Additionally, the method includes rotating the end effector and the gladhand relative to the trailer mating surface and the gladhand mating surface, at the mating position. The method further includes repositioning the end effector and the gladhand.

In an example, determining the mating position is further based on machine learning. In another example, the at least one image includes a first image and wherein positioning the end effector is further based on a second image. In a further example, repositioning the end effector and gladhand includes coupling the gladhand to the vehicle. In yet another example, rotating the end effector and the gladhand relative to the trailer mating surface decouples the gladhand mating surface from the trailer mating surface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIGS. 5A-5B depict top-down illustrations of a tractor trailer system, including a workspace limited by dynamic operation of the tractor trailer system.

FIGS. 10A-10J show an end effector, and components of an end effector.

FIG. 14A shows an example point of view of a first camera.

FIG. 14B shows an example point of view of a second camera.

FIGS. 20A-20C show rectilinear projection and various forms of image distortion.

Figure 1:
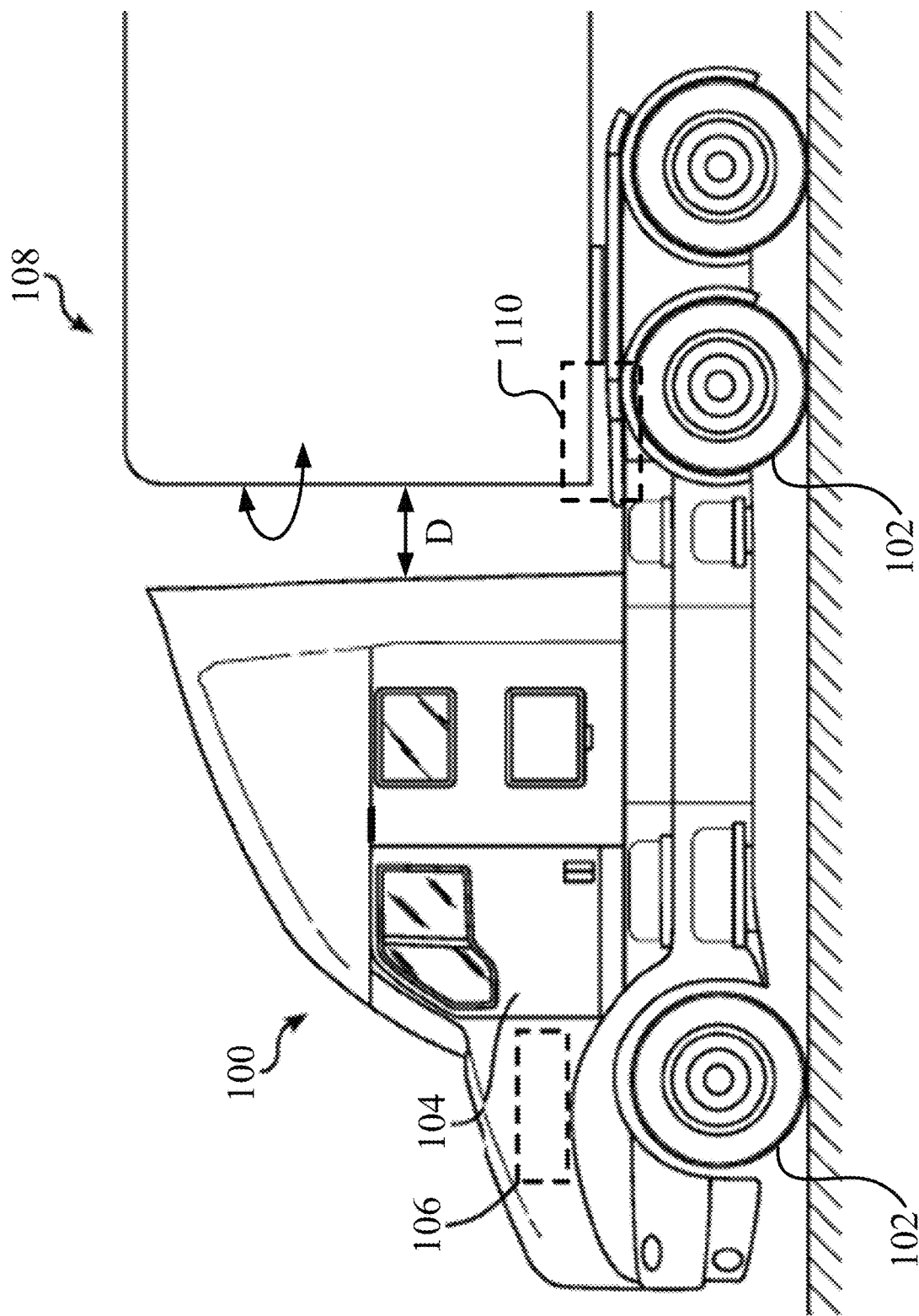
FIG. 1 depicts a side view of a vehicle.

While examples of the disclosure are amenable to various modifications and alternative forms, specific aspects have been shown by way of example in the drawings and are described in detail below. The intention is not to limit the scope of the disclosure to the particular aspects described.

DETAILED DESCRIPTION

Vehicles are shifting towards self-automation and self-driving modes. In particular, various aspects of tractor-trailer systems are also being automated. One such process is the connection of tractor-trailer pneumatic and electric lines. Often, each tractor is equipped with a pneumatic hose and an electrical line to be connected prior to vehicle movement. Connecting these lines has previously been done manually by the truck operator, and often requires a high level of dexterity and force to hook up the lines. The ability to automatically connect air and electric lines is a critical step in having an automated truck.

The process requires the airlines' connectors, gladhands, and the electric line to be moved and secured to the front of the trucks' gladhand/electrical configuration. For a successful connection, the airlines are rotated and/or torqued into position and sealed to maintain operational pressure (e.g., 140 psi), and the electrical plug is pushed into its socket. Of the variety of connections, the present disclosure focuses on the connection of the emergency pneumatic line (e.g., air line for the emergency braking system of the trailer), although the present disclosure may be applied to a variety of connections. A proposed solution is detecting and locating the gladhands using a camera system and sealing the airline with a specially designed end effector and modified gladhand. Although the present disclosure discusses components operating to connect lines of the vehicle to the trailer (vehicle-side), it should be appreciated that the components may be independent of the vehicle and/or trailer, or may be operable to connection the trailer to lines of the vehicle (trailer-side).

Two cameras may be used to identify and locate the gladhands. The cameras may be mounted on the back of the cab. Custom software may identify and locate the gladhands from a depth map of the camera.

The custom gladhand (otherwise referred to herein as a "mechand") may be capable of mating with any connector (e.g., including any connectors under the SAE J318 standard). The mechand may utilize an externally driven rotational mechanism to mate with the trailer gladhand, minimizing the input torque and reducing the structural and actuating requirements of the end effector. The end effector may combine a clamp and rotational drive mechanism to index, position, and actuate the mechand.

Steel mounts may be fabricated and attached to the chassis. Additionally or alternatively, mounts may be 3D printed or machined to hold the end effector and computer vision components. A separate mount for the hose lines may be fabricated to imitate the setup on a real truck.

A mechanized gladhand and an end effector may be used to assist in automating the gladhand coupling process. In aspects, the system may identify, locate, grab, and attach the emergency gladhand from the cab to the trailer. The system may use a computer as the main hub controlling each of the components of the system. Utilizing the cameras of the system, a custom computer vision suite may locate and identify the gladhands on the back of the trailer and determine or calculate a mating position for the end effector. A modified gladhand may be capable of mounting on the airlines, and removably couplable to the end effector (e.g., capable of being picked up by the end effector).

As described herein, a depth map may be an image with a channel associated with recorded depths for each respective pixel. As also described herein, a gladhand may include connectors used to connect gas and power from truck to trailer. Additionally, a mechand, as used herein, may be a customized or modified gladhand. An end effector may moveable or positionable to interact with the environment. References to RealSense may be an Intel RealSense (RGB-D) depth camera D435. As used herein, an "SDK" refers to a "software development kit," a "POV" refers to "point of view," and an "FOV" refers to "field of view." As further used herein, a tractor and/or cab may mean the front end of a tractor/trailer system.

FIG. 1 depicts a side view of a vehicle 100. In the example depicted, the vehicle 100 is a truck with a chassis supported by wheels 102. The vehicle 100 may be a part of a tractor-trailer combination, or tractor-trailer system, which may include the vehicle 100 having a so-called fifth wheel by which a box-like, flat-bed, or tanker semi-trailer 108 (among other examples) may be attached for transporting cargo or the like. A distance D may be seen between the vehicle 100 and a trailer 108 when the vehicle 100 and the trailer 108 are aligned. The distance D varies, however, when the vehicle 100 and the trailer 108 are not aligned, such as when the vehicle 100 is turning (sometimes referred to herein as "trailer swing"). Limited clearance 110 may exist between the trailer 108 and the point of connection on the vehicle 100. While the vehicle 100 is depicted as a truck in FIG. 1, it should be appreciated that the present technology is applicable to any type of vehicle where gladhand connections are required or desired.

The example vehicle 100, otherwise referred to herein as a truck, tractor, or cab, includes a cabin 104 from which a driver may steer the vehicle 100. The vehicle may include a power and control system 106 to operate the vehicle 100. The trailer 108 may include gladhand coupling assemblies to allow coupling of pneumatic lines with the trailer 108 to assist in releasing and applying the brakes on the trailer 108. Manual coupling of the vehicle gladhands with the trailer may take a substantially amount of a driver's time and/or may result in physical exertion of the driver to obtain a tight connection. According to the present technology, a gladhand on the vehicle 100 may be altered to minimize physical exertion while obtaining a connection and/or the gladhand may be mechanized to couple with the trailer without user intervention (e.g., by using a linear actuator and/or an end effector described herein). The components and operations of example gladhands, end effectors, linear actuators, and automated gladhand connection are discussed in further detail, below.

Figure 2B:
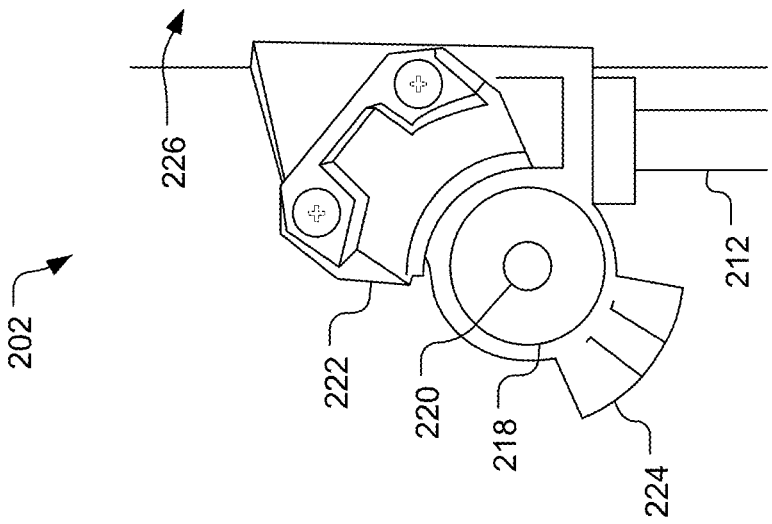
FIGS. 2A-2B depict example gladhand coupling attachments positioned on a trailer.
Figure 2A:
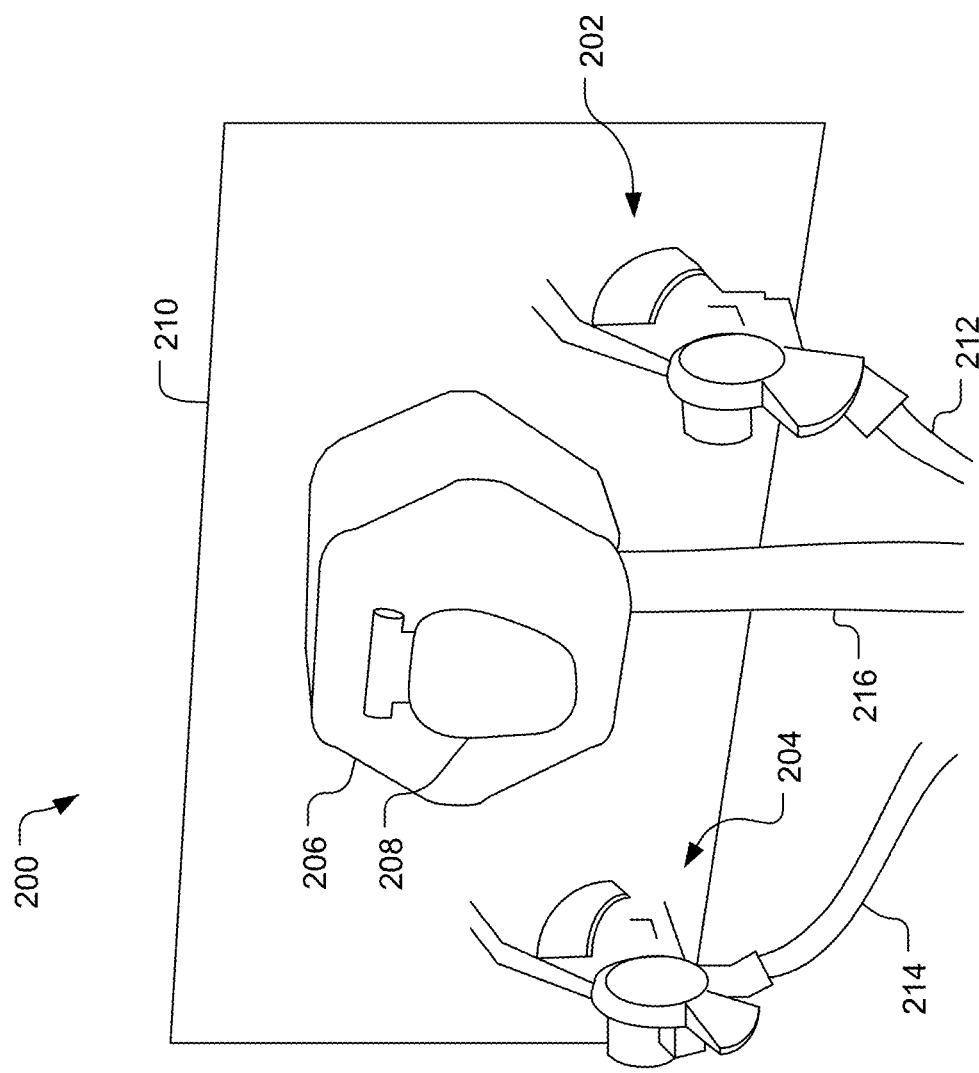

FIGS. 2A-2B depict example connection ports 200 positioned on a front of a trailer 226, as known in the art. The connection ports 200 may include trailer emergency brake lines, connections that enable movement in tandem, including a power supply, emergency pneumatic brake line, and nominal pneumatic brake line. The perspective view of example connection ports 200 shown in FIG. 2A includes a first gladhand connection site 202, a second gladhand connection site 204, and a power connection site 206. The power connection site 206 may include a movable protector 208 for safety. The connection ports 200 may be mounted to the trailer 226 with a bracket 210. Each port or site of the connection ports 200 is coupled to the trailer 226. The first gladhand connection site 202 is coupled to the trailer 226 via a first pneumatic line 212 and the second gladhand connection site 204 is coupled to the trailer 226 via a second pneumatic line 214. The power connection site 206 is electrically coupled to the trailer 226 via a power line 216.

A side view of the first gladhand connection site 202 is shown in FIG. 2B. A gladhand connection site, such as the first gladhand connection site 202, includes a sealing surface 218, a pneumatic port 220, a connector plate 222, and a detent plate 224. The sealing surface 218 frictionally seals the pneumatic port 220 when pressure is applied between the sealing surface 218 of the connection site and a sealing surface of a gladhand. The connector plate 222 of the gladhand connection site is capable of receiving a detent plate of a gladhand and the detent plate 224 of the gladhand connection site is capable of being received by a connector plate of a gladhand. A gladhand is positioned and rotated at the gladhand connection site to removably couple the gladhand connection site with a gladhand. This process is sometimes referred to as gladhand coupling.

Figure 3B:
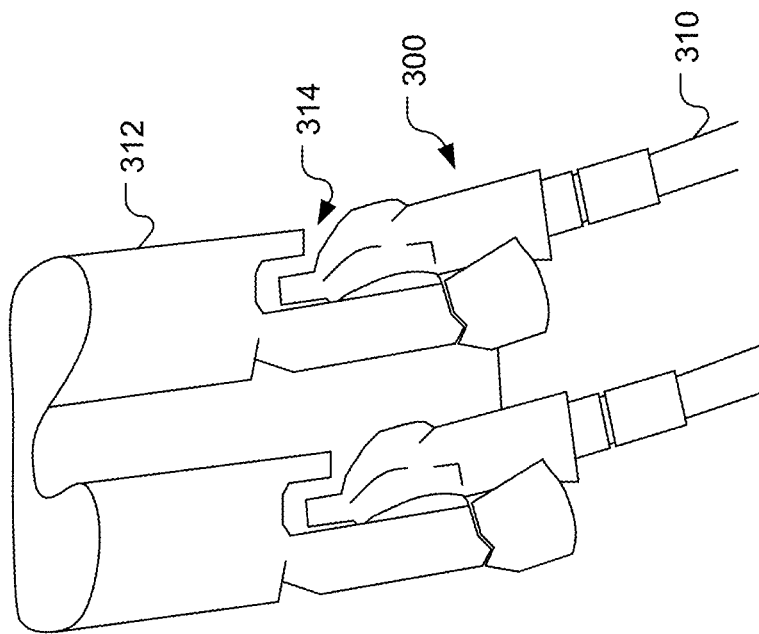
FIGS. 3A-3B depict example gladhand attachments positioned on a cab.
Figure 3A:
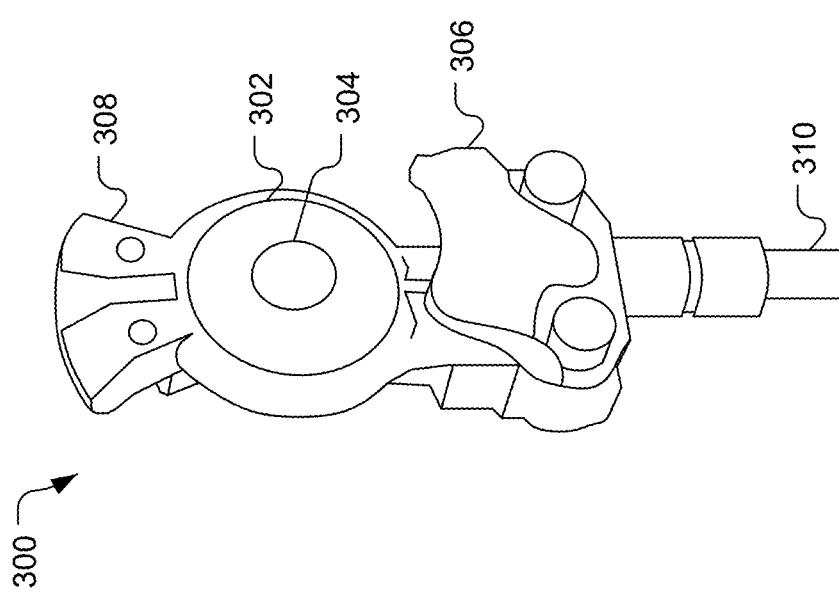

FIG. 3A depicts an example gladhand 300 that is prior art. The gladhand 300 includes a sealing surface 302, a pneumatic port 304, a connector plate 306, a detent plate 308, and a pneumatic line 310 coupled to the vehicle (e.g., vehicle 100 in FIG. 1). As further described above with respect to FIGS. 2A-2B, the gladhand 300 couples to a gladhand connection site, such as gladhand connection sites 202, 204 shown in FIG. 2A. The sealing surface 302 frictionally seals the pneumatic port 304 of the gladhand to the gladhand connection site when pressure is applied between the sealing surface 302 of the gladhand and a sealing surface of a gladhand connection site (e.g., sealing surface 218). The connector plate 306 of the gladhand is capable of receiving a detent plate of a gladhand connection site (e.g., detent plate 224) and the detent plate 308 of the gladhand is capable of being received by a connector plate of a gladhand connection site (e.g., connector plate 222).

FIG. 3B shows an example tractor mount 312 for one or more gladhands (e.g., gladhand 300) coupled to a vehicle, as known in the art. The tractor mount 312 may include one or more receiving portions 314 to receive a gladhand 300 such that the pneumatic port 304 supplied by a pneumatic line 310 from the vehicle is sealed. To seal the pneumatic port 304, the receiving portions 314 may include features of the gladhand connection site further described above.

Figure 4:
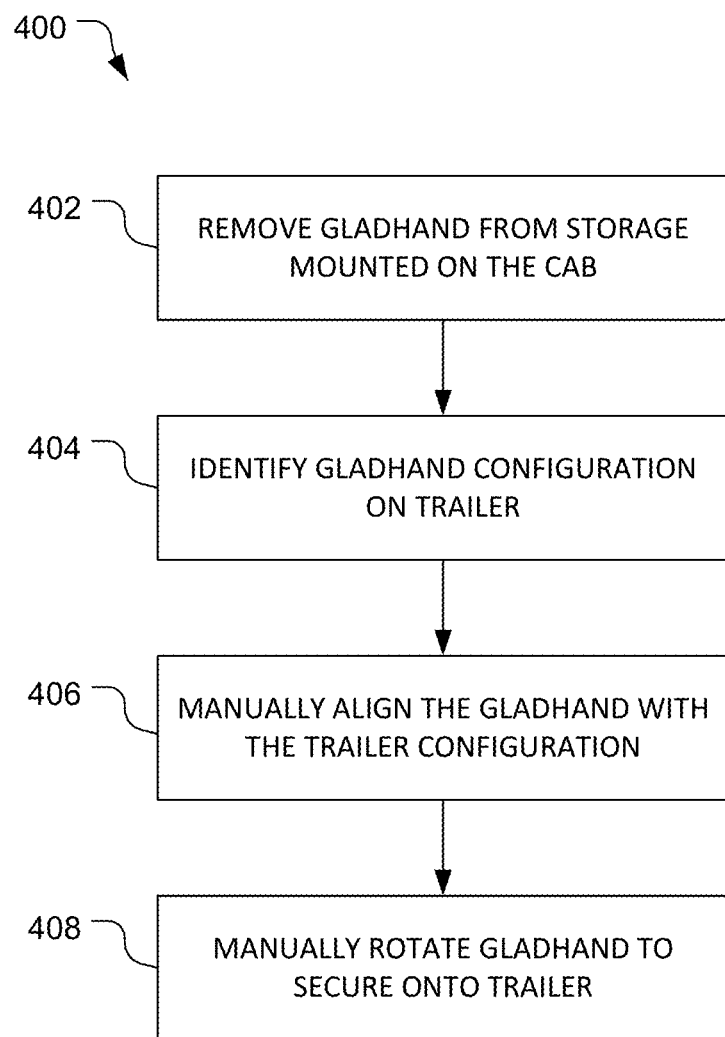
FIG. 4 depicts an example method for manual connection of gladhands between a cab and a trailer.

FIG. 4 depicts an example method for manual connection of gladhands between a cab (e.g., vehicle 100) and a trailer (e.g., trailer 108), as known in the art. The gladhands follow strict guidelines outlined by the Society of Automotive Engineers. The term 'gladhand(s)' may be used interchangeably with the term 'connectors' throughout this disclosure.

Connection of the pneumatic and electric lines from the cab to the trailer has previously been done manually by a truck operator. These connections often require substantial dexterity and force to be applied by the truck operator to adequately couple the gladhands (e.g., form a secure, sealed connection between the gladhand and the gladhand connection site). The method 400 shown in FIG. 4 shows an example of manual connection of a gladhand. The method 400 begins at operation 402 where a gladhand is removed from storage mounted on the cab. The storage on the cab may include the tractor mount 312 described in FIG. 3B. Multiple gladhands may be stored and/or removed concurrently.

At operation 404, a gladhand configuration on the trailer is identified. In an example, the user performing the manual gladhand coupling may visually scan the front of the trailer to identify a trailer configuration (e.g., which may include a gladhand connection site) to couple the gladhand removed from stored at operation 402. In some examples, a gladhand may couple to a specific gladhand connection site.

At operation 406, a gladhand is manually aligned with the trailer configuration. Manual alignment of the gladhand may include aligning a component of the gladhand with a component of the trailer configuration. For example, a sealing surface of the gladhand may be aligned with a sealing surface of the trailer configuration or a pneumatic port of the gladhand may be aligned with a pneumatic port of the trailer configuration.

At operation 408, the gladhand is manually rotated to be secured onto the trailer at the trailer configuration. After being rotated, a connector plate of the gladhand may be aligned with a detent plate of the trailer configuration and a detent plate of the gladhand may be aligned with a connector plate of the trailer configuration. Pressure may be applied when rotating the gladhand, as required or desired. The alignment of the sealing surfaces of the gladhand and the trailer configuration may result in frictional force, which may cause physical exertion of the user providing the manual gladhand coupling.

FIGS. 5A-5B depict top-down illustrations of a tractor trailer system 500, including a vehicle 502, a trailer 504, and a workspace 506 that is limited by dynamic operation of the tractor trailer system 500. Each tractor trailer system 500 may have different parameters to consider, such as locations of mounted gladhands, hoses, and distance between the cab 502 and the trailer 504. Although aspects of this disclosure may be specific to features of a Trailer 300 by Kenworth, it should be appreciated that aspects described herein may be applicable to a variety of tractor trailer systems.

One consideration of the present disclosure is limited workspace 506. Placement of various components may be limited due to the dynamic movements required by the cab 502 and trailer 504. The initial workspace parameters may include a variety of example dimensions, including a 42" distance between the back of the cab 502 and the front of the trailer 504 when the cab 502 and trailer 54 are aligned, and the entire width of the back of the cab 502.

The workspace 506 may be further reduced due to trailer swing shown in FIG. 5B. FIG. 5B shows a top-down illustration of a trailer swing during a turn. Trailer swing occurs as the cab 502 makes a sharp turn. During trailer swing, the back of the trailer sweeps an arc spanning a majority of the space between the cab 502 and trailer 504. This may significantly reduce the allotted working distance (e.g., from 42" to 2") at the center of the cab 502. The clearance between the trailer 504 and its chassis may be approximately zero when the trailer swings, because a system installed above the rails may be destroyed. Further restrictions to the workspace 506 may include locations of gas tanks on the vehicle, suspension systems of the vehicle, and other attachments to the vehicle.

The workspace 506 shown in FIG. 5B illustrates an unobstructed area (e.g., an area free from collisions) between the cab 502 and the trailer 504 accounting for potential trailer swing. Thus, the workspace 506 indicates a safe zone to mount components of the described technology that is not impacted by trailer swing, constriction by a gas tank, and the suspension system of the vehicle. To the side of the chassis, a modular space may be designated for external generators, step stools, and other components. In an example, this modular space was measured to be 36"×32"× 30" in volume.

Figure 6A:
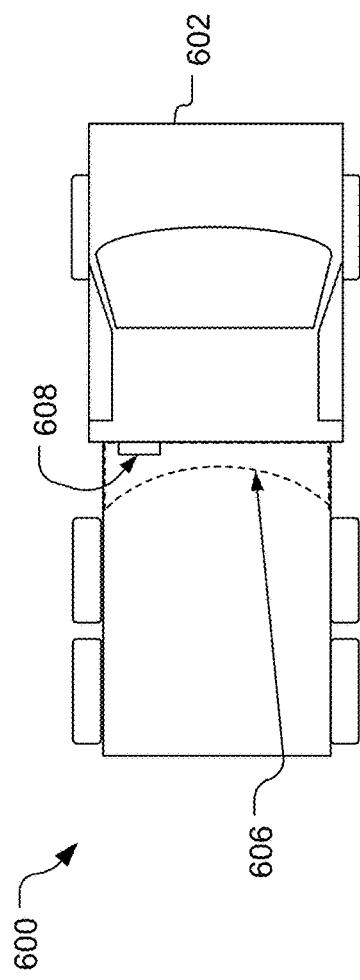
FIGS. 6A-6B depict an example location of a mechanized gladhand assembly to be mounted and stored on a cab of a truck.
Figure 6B:
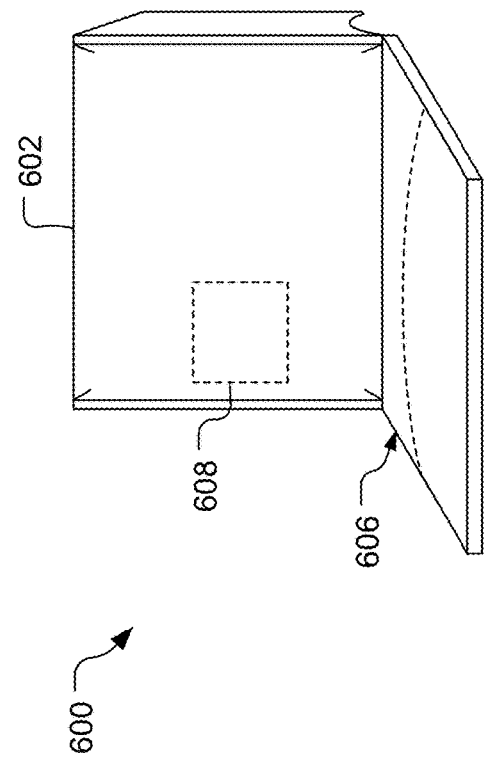

FIGS. 6A-6B depict an example assembly location 608 of mechand components in a workspace 606 on the back of a cab 602 of a vehicle system 600. Because trailer swing restricts the workspace 506 near the center of the cab 602, the assembly location 608 may be desired to be positioned towards a side of the cab 602. As shown in FIG. 6A, the assembly location may be near the driver's side of the cab 602 for easy access by a truck operator.

The mechand components to be included in the assembly location 608 may include an end effector, control system, and computer vision. The design may account for placement of the system on the truck 602, support structures for mounting, and the motions of the system. The computer vision system may include a primary system and a secondary system. The primary system may utilize a first, depth camera, mounted to the truck 602, capable of identifying and locating the gladhand connection site(s) on the back of the trailer. In an example, the first camera may be an Intel RealSense®. After the gladhand connection site(s) are located by the primary system, this information may be used to position or reposition the end effector to a location near a gladhand connection site. The secondary camera system may be mounted on the end effector and may function by locating the pneumatic port (e.g., center hole) of the trailer-mounted gladhand connection site. The control system may perform or send instructions to another component to move or position the end effector to precisely line up the end effector for the gladhand coupling procedure. The end effector may rotate, along with rotating a coupled, modified gladhand, such that the modified gladhand is in a mating position, sealing the connection and pressurizing the trailer.

Figure 7:
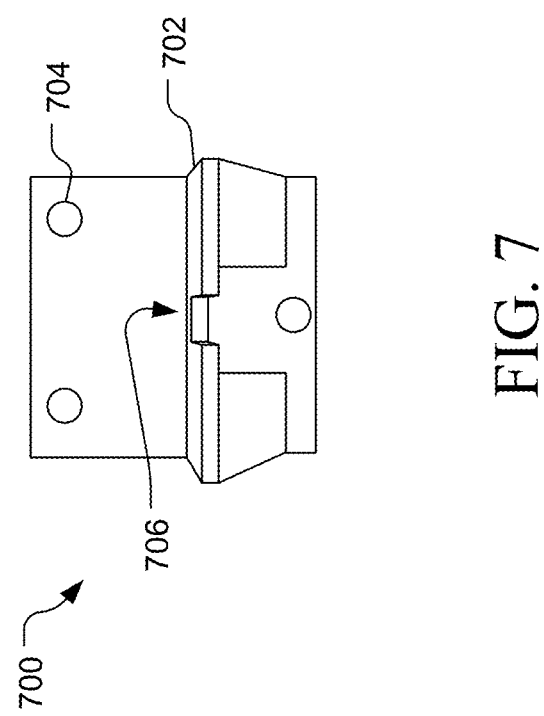
FIG. 7 depicts an example camera mount.

FIG. 7 depicts an example camera mount 700. The camera mount 700 is capable of securing a camera. For example, a camera may rest on a support surface 702 of the camera mount 700. The camera may be removably coupled to the camera mount 700 via clamping or tightening onto the support surface 702, such as at the securing gap 706 in the support surface 702. The camera mount 700 may be mounted on the back side of the cab. For example, the camera mount 700 may be secured via screws or similar means via access holes 704. The primary camera system (e.g., Intel RealSense) may be mounted onto the back of the cab looking towards the trailer. The camera mount may be 3D printed, molded, or otherwise fabricated. The camera mount 700 shown in FIG. 7 shows one example of a camera mount and other mounts or supports are appreciated. For example, the camera mount 700 shown in FIG. 7 may only be a portion of a complex camera mount.

FIGS. 8A-8D depict linear actuator assemblies 800A, 800B, and components of linear actuator assemblies, for moving an end effector in three-dimensional space. The linear actuator assemblies 800A, 800B may be positioned between the cab 808 and the trailer 810 in a workspace free from potential collisions, such as the position shown in FIGS. 8C-8D. As shown, the linear actuator assembly 800A, 800B is positioned on the chassis of the cab 808 below the base 812 of the body of the trailer 810.

Figure 8C:
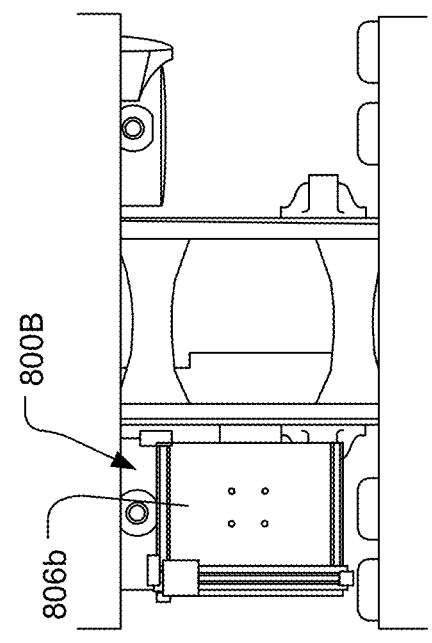
FIGS. 8A-8D depict linear actuators, and components of linear actuators, for moving an end effector in three-dimensional space.
Figure 8B:
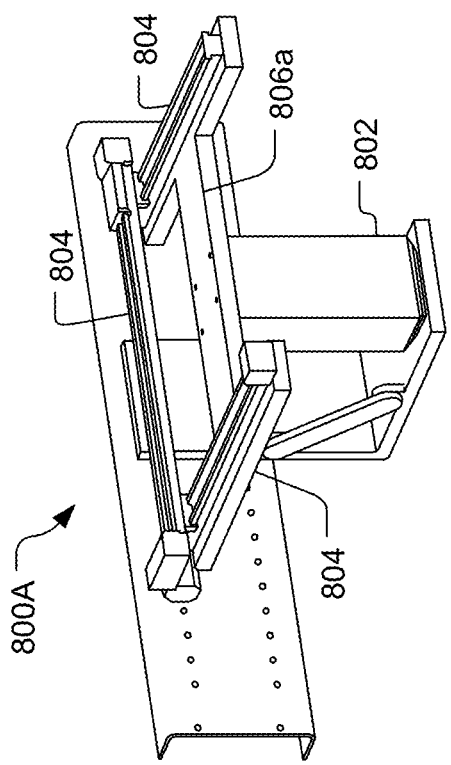
Figure 8A:
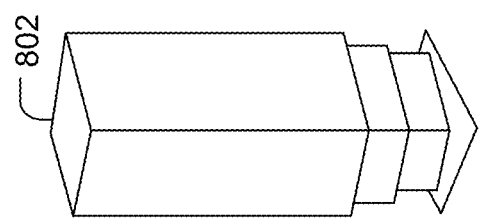
Figure 8D:
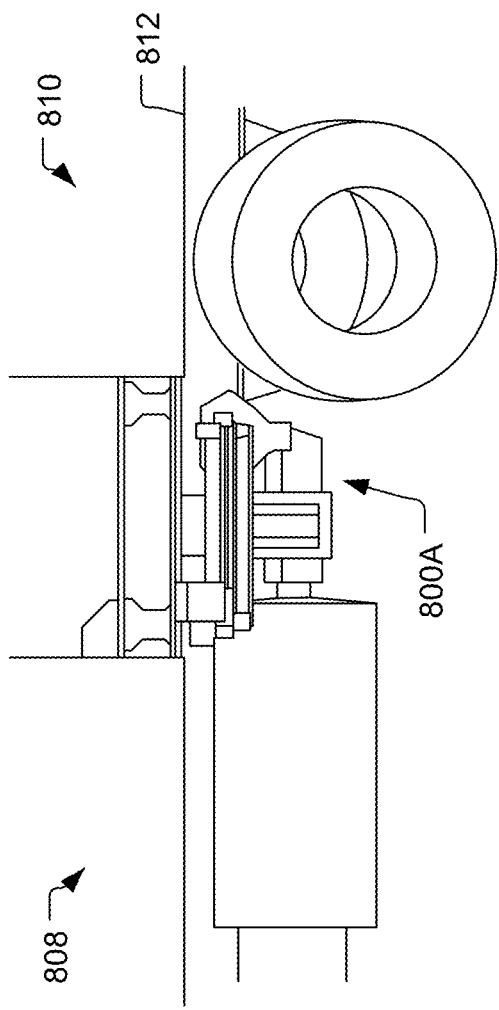

Linear actuators may run on electricity (e.g., 24V DC) with feedback control compatibility. For example, as shown in FIGS. 8A-8B, a lifting column 802 may include a telescopic lead screw. In another example, the lifting column 802 may include end-of-stroke limit switches. In a further example, the motor may be connected via a cable. In another example, the lifting column 802 may include encoder position feedback. In an example, the lifting column 802 may be an LC2000. In another example, the lifting column 802 may have a variety of specifications, including a maximum load, a maximum load torque, available input voltages, minimum ordering stroke, maximum ordering stroke, and lead cross section. In an example, the lifting column 802 has the following specifications: a maximum load of 2000 N, a maximum load torque 150/500 Nm (dynamic/static), speed of 19/15 mm/s (no load, maximum load), available input voltage of 24 VDC, minimum ordering stroke of 200 mm, maximum ordering stroke of 600 mm, and lead cross section of 1.5 mm$^2$.

A lifting column 802 is shown in FIGS. 8A-8B for vertical motion. The lifting column may be a robust telescoping linear actuator with a platform on the top and a retracted length of, in examples, approximately 17 inches. A platform 806a, 806b on the top of the linear actuator assembly 800A, 800B may be capable of handling large moments which would be applied to the platform as the end effector moves on the horizontal actuators providing a downward force. In an example, the lifting column 802 is an LC2000 series lifting column from Thomson Linear compatible with feedback controls and capable of being integrated into the control system.

Horizontal rails 804 (otherwise referred to as linear actuators 804) and/or actuators may be used for horizontal motion. In an example, three linear actuators 804 may be used to move linearly in an XYZ coordinate system. For example, the linear actuators 804 may allow linear movement in two directions: x-direction (side-to-side motion) and y-direction (forward-backward motion). The third direction (vertical direction), the z-direction (up-down motion), is controlled by the lifting column 802, which supports the base plate 806 holding the linear actuators 804. The horizontal (x- and y-direction) motions may be enabled by a two-axis gantry system including two rodless linear actuators 804 and a linear actuator 804 mounted on a base plate 806. In an example, the linear actuators may be belt driven, rodless linear actuators due to their durability and low maintenance requirements, even in dirty environments. In an example, the actuators may be SIMO Series rodless, linear actuators manufactured by PBC Linear. The linear actuators may be used to position the end effector.

FIGS. 9A-9D show various views of a customized, mechanized gladhand, otherwise referred to herein as a "mechand," "modified gladhand," or "mechanized gladhand." The changes shown from the features of a standard gladhand result in an easier autonomous mating process. The connection between two standard gladhands is traditionally made by aligning the contact flanges at an approximately ninety-degree offset, contacting the central gaskets (e.g., sealing surfaces), and then rotating the flanges into position (e.g., the gaskets of each gladhand rotate relative to each other, with their respective flanges, to be mated). The friction opposing this process can be substantial and is a product of the total spring force (provided by the rubber gaskets) required to hold the gladhands in a locked position. Due to substantial frictional forces, gladhand coupling with a traditional gladhand can be difficult to perform manually. The customized gladhand ("mechand") shown in FIGS. 9A-9D is a rotationally articulated connection system that may interface directly with the standard gladhand connection site geometry, including as specified in SAE J318. In examples, the mechand shown reduces the torque required in the connection process by a large factor (e.g., approximately ten-fold); this in turn enables a significant reduction in the weight, cost, and complexity of an end effector to be used to facilitate an automated gladhand coupling, and a proportional reduction in the capability of the gross movement system.

The mechand shown in FIGS. 9A-9D reduces the force required by articulating the connecting flanges in relation to the central plunger out of contact with the flanges on the gladhand, and then extending the central plunger to bring the flanges into contact and provide the required clamping force. The design allows these steps to be completed sequentially, with no control input other than a unidirectional application of mechanical torque to an externally accessible drive axle.

The mechand may include a variety of rotational groups. For example, the mechand may include three main rotational groups: the plunger 912, the collar 918, and the turret 906. The outermost section (turret 906) includes the main body of the mechand 900 and includes the mounting points for the air hose and drive pinion bushing. The innermost section 912 or plunger 912 may be retained to the turret 906 on a rotational bearing. The plunger 912 may include a drive gear that mates with the pinion on the turret 906 and a central face-cam that impinges on the final section 918 or collar 918. The collar 918 may be located concentric to the axis of the turret 906 and the plunger 912; may be constrained against the rear of the plunger face by a face-cam (complimentary to that on the plunger) and/or against the turret 906 by a spring 916. The collar may include imitations of the flanges on the stock gladhand and may not be rotationally constrained to the turret 906, and thus may be free to rotate within the constraints imposed by the interaction of the plunger 912 and collar cam 914. The spring-loading of the collar against the turret 906 (and the resulting axial force against the rear of the plunger) may ensure constant engagement of the cam mechanism.

During the mechand attachment and detachment operation, the turret 906 may provide the geometry on which the end effector clamp engages and disengages, and/or may provide index points for the mating of the end effector drive shaft and mechand drive pinion. During normal operation (e.g., the mechand attached to gladhand and the tractor-trailer is in motion) the turret 906 can rotate freely against the collar and plunger, providing an element of mechanical flexibility to the hose connection and reducing the external force on the clamping system. An o-ring may be included between the joint of the turret 906 and the plunger 912 to provide a sealed duct through which air can flow from the mechand hose to the trailer brake circuit.

During attachment, detachment, and normal operation, the plunger may provide the contact area between the central rubber gasket on the stock gladhand and the mechand. The plunger 912 may have a central air-duct for the hose circuit, and concentric and external to that duct may be the plunger face cam. The normal vector of the face cam may be opposite that of the plunger contact with the gladhand. Axially aligned to the duct axis and external to the plunger cut, the collar may provide the structure for a face cam (complimentary to that of the plunger) and the mounting of the structural flanges.

The face-cams on the plunger and/or the collar may provide the mechanical interaction for the function of the mechand. When the collar is unconstrained, the force of the turret-collar-spring may prevent the cams from rotating against each other. When the flanges of the collars are impinged by the flanges on the gladhand, the force between the cams may overcome the axial force of the spring (e.g., a threshold force), and may induce a relative rotation between the cams and force the collar away from the gladhand, which may bring the mechand flanges into contact with those on the gladhand.

Figure 9C:
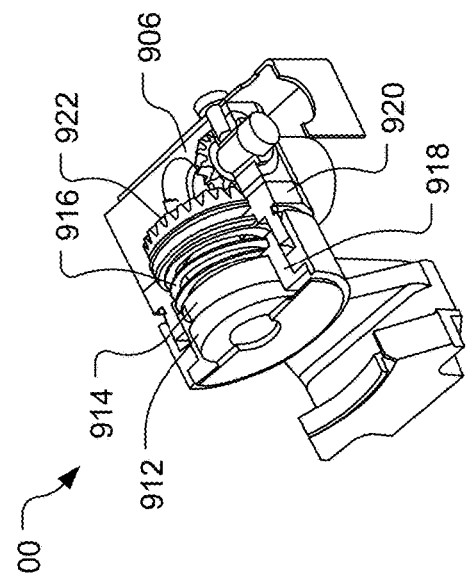
FIGS. 9A-9D show various views of a customized, mechanized gladhand, otherwise referred to herein as a "mechand."
Figure 9B:
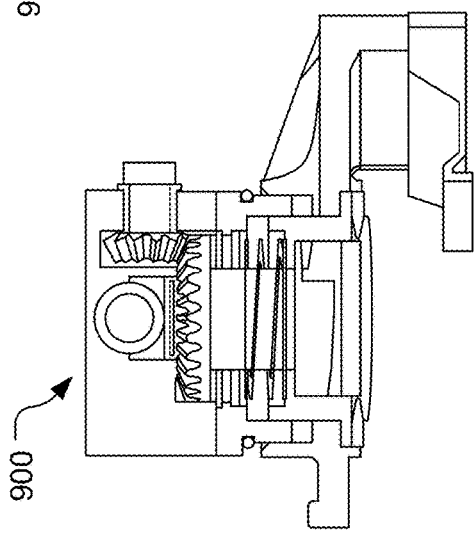
Figure 9A:
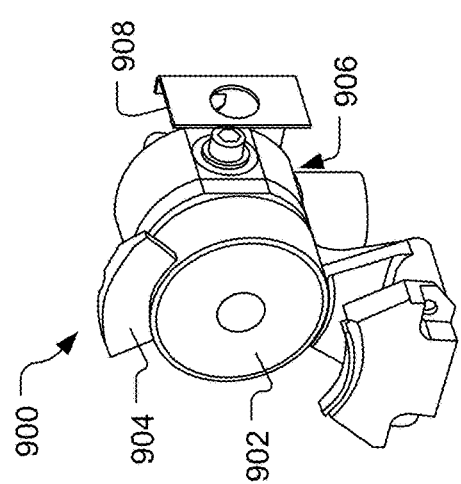
Figure 9D:
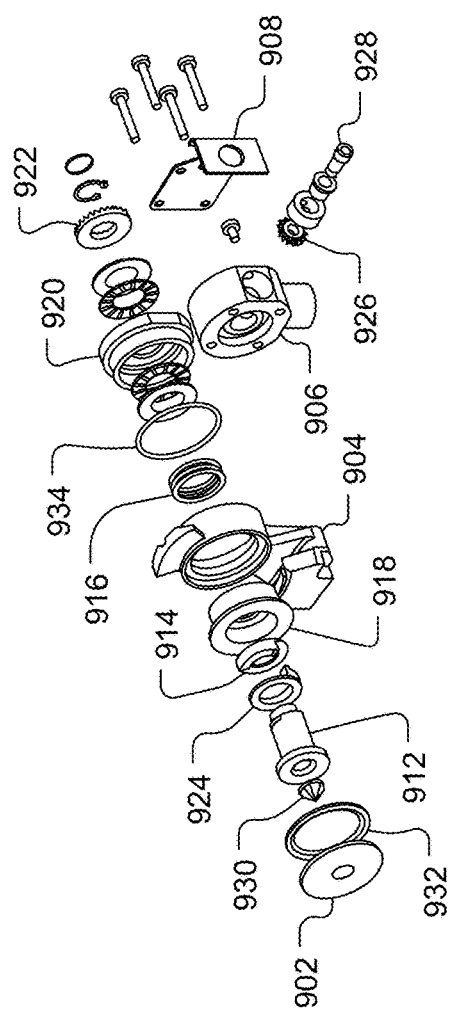

FIG. 9D shows an exploded view of the mechand. The mechand may include a plunger 912, a collar 918, a plunger cam 924, a collar cam 914, a turret 906, a turret ring 920, a turret bevel gear 922, a turret pinion gear 926, a turret pinion axle 928, a collar retention spring 916, a lug plate 908, a plunger bellow retention insert 930, a bellow retention ring 932, a plunger/collar bellow 902, a collar sleeve 904, and a collar weather seal 934.

The mechand may be designed to reduce reaction loads on the trailer coupling process. Additionally or alternatively, the mechand may increase the potential to automate the tractor-trailer coupling process by first redesigning a gladhand (an interlocking hose coupling device) fitted to hoses supplying pressurized air between the host (chassis) and the accessory (trailer). The mechand may improve the connection reliability and reduce the required forces during the handshake from the connection process. The two mating surfaces may be continued, but may not contract or rotate, while only the collar has the rotational motion to perform the locking mechanism of the handshake. Once the rotational motion of the collar has completed, a mechanical system behind the mating surface may generate the sealing force. Alternatively, the sealing force may be generated prior to any rotational motion, or during rotational motion of the flange. This new process may drastically reduce installation reaction loads due to the elimination of the friction forces between the two mating surfaces. This reduction in reaction loads may permit automating the process with a lightweight extending arm while maintaining the integrity of the connection.

The mechand may have a variety of advantages, including a combined center-locating and automatic shut off, lower coupling forces transmitted back through the gladhands, adaptable to mate with multiple drivers other than gladhands, useful with multiple tools by the end effector described herein, compact in size of the gladhand package, and/or increased difficulty for inadvertent disassembly for increased security. Additional advantages may include alleviating the rotating motion on the mating surfaces around the central air path, combining the central locating feature and the air control mechanism, reducing reaction forces during the coupling process, simplifying automation processes by reducing assembly reaction forces, combining locating feature and actuation and by mechanizing the ability to increase surface pressure forces for seal integrity, or allowing multiple automated control features to locate and clamp to mating surfaces.

Figure 10A:
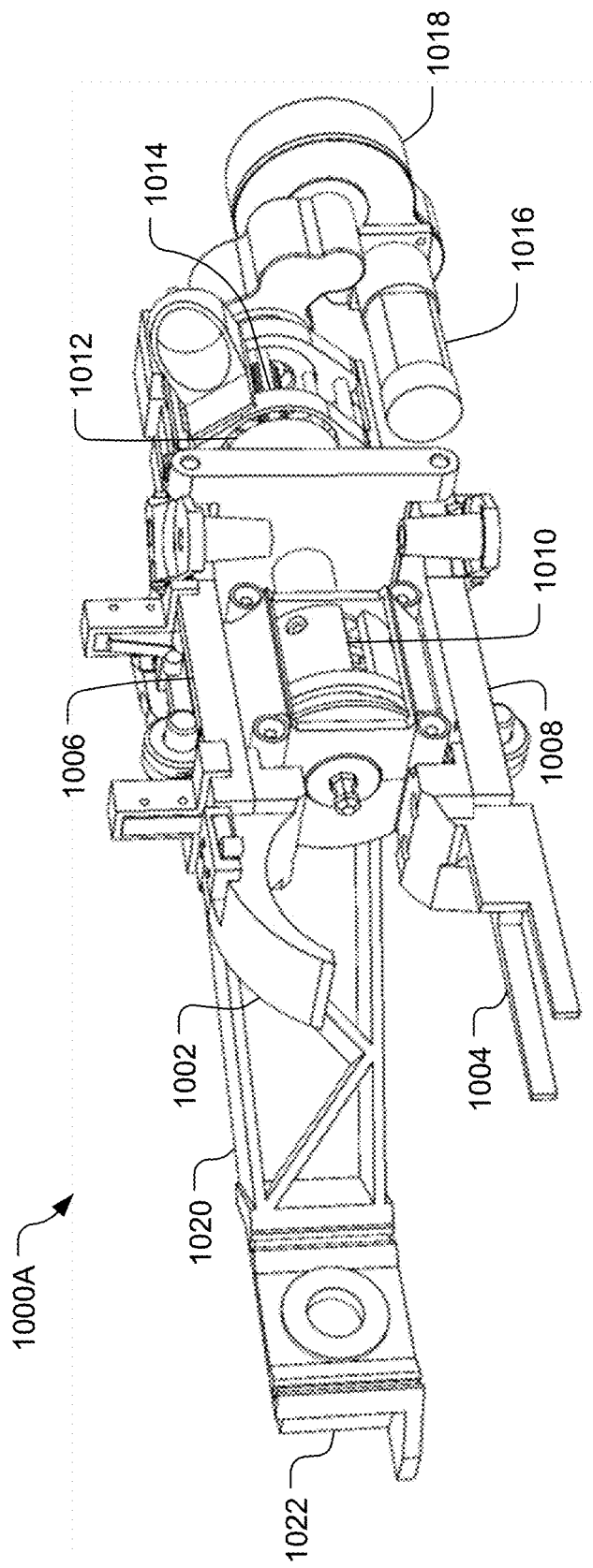
Figure 10B:
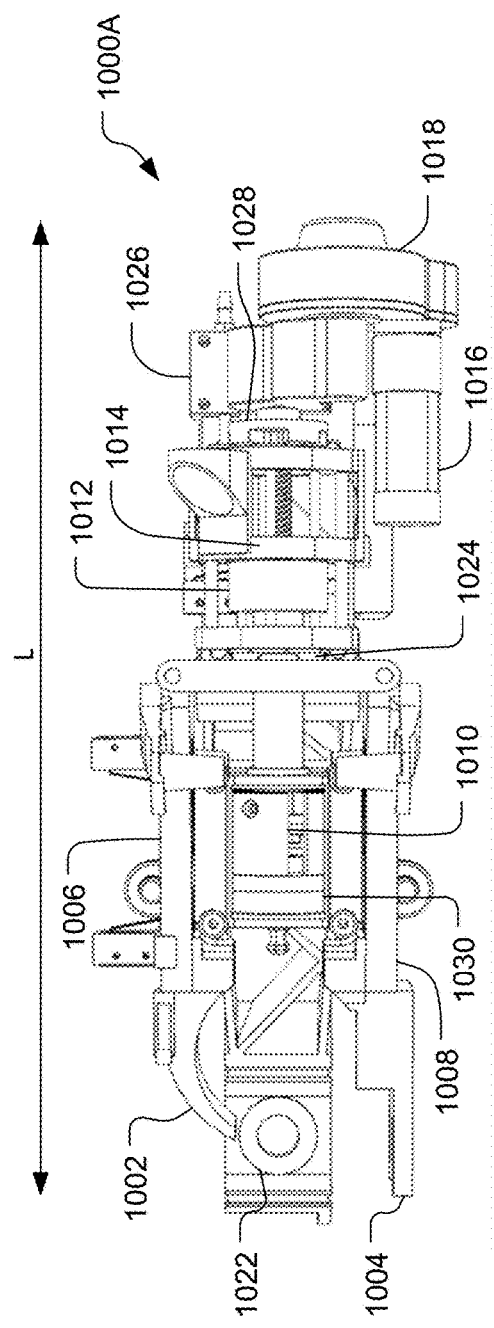
Figure 10C:
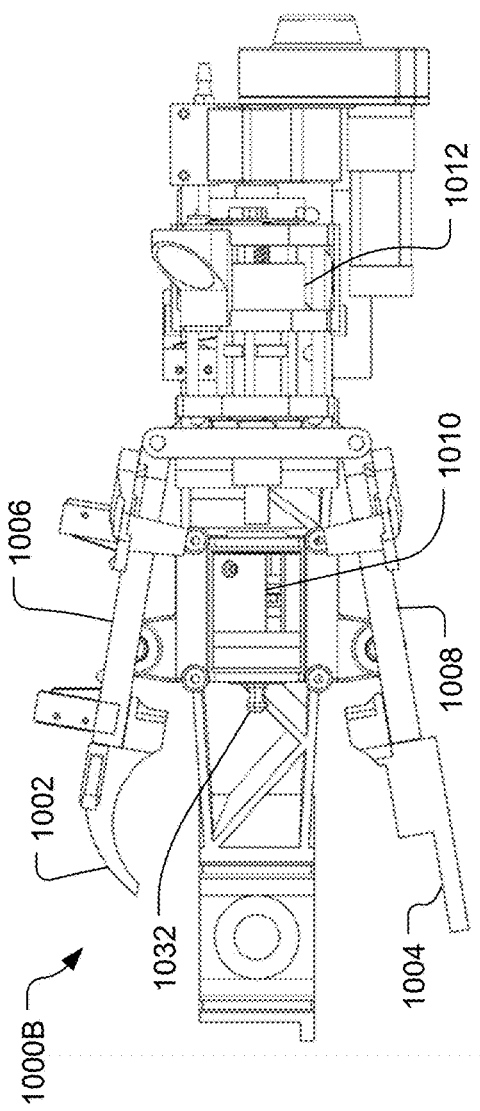
Figure 10J:
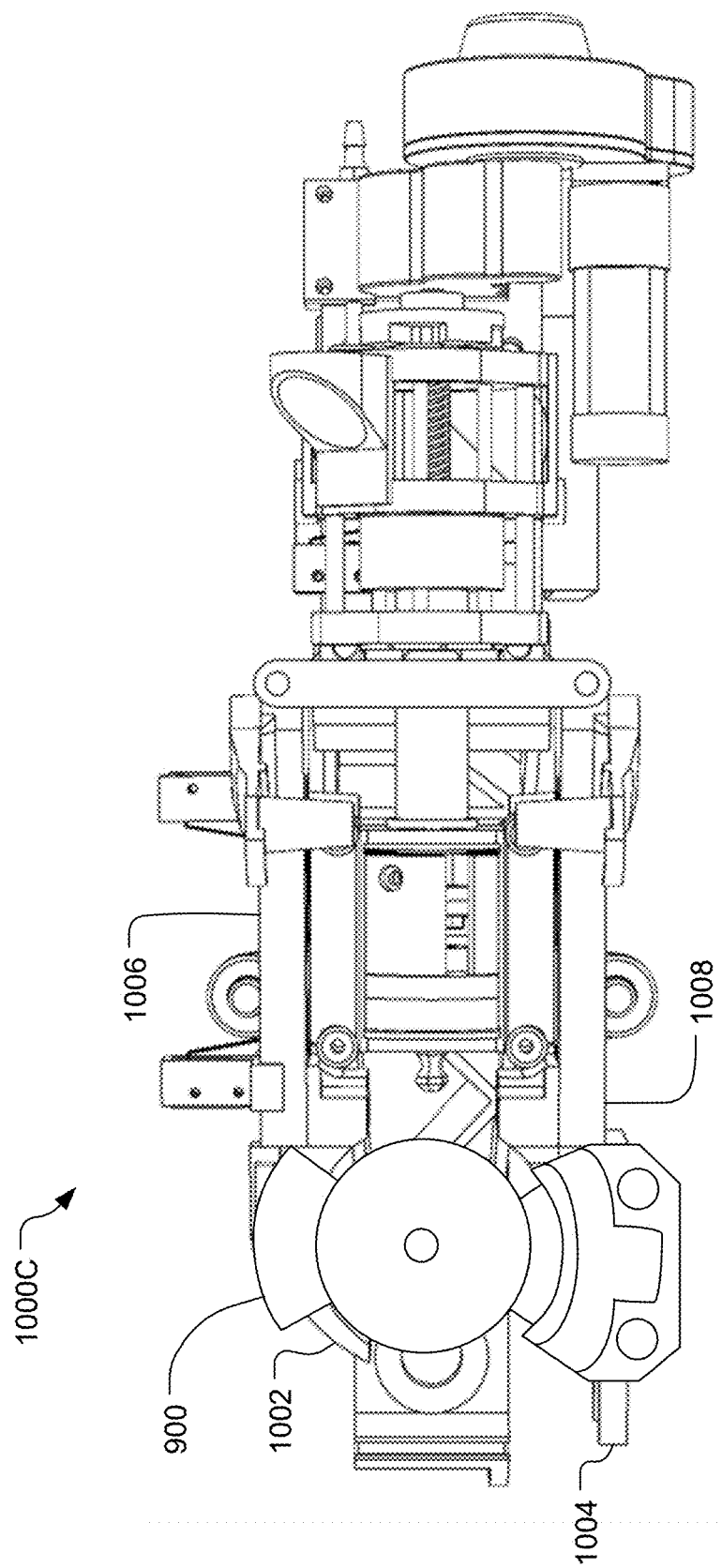

FIGS. 10A-10J show an example end effector and components of the example end effector. FIG. The overall assembly of the end effector is shown in FIG. 10A. As shown in FIGS. 10B-10C, the end effector has at least two configurations: a clamped configuration 1000A of FIGS. 10A, 10B, and 10J, and an unclamped configuration 1000B of FIG. 10C. In the clamped configuration 1000A, the top clamp 1002 and bottom clamp 1004 of the end effector are positioned such that a gladhand is securable between the top clamp 1002 and the bottom clamp 1004. In the unclamped configuration 1000B, the top clamp 1002 and bottom clamp 1004 are angled and spaced apart such that a gladhand is not securable. FIG. 10J shows the end effector in a clamped configuration 1000A securing the mechand 900 of FIGS. 9A-9B. FIGS. 10E and 10F show the shifter carriage 1014 of the end effector in the clamped configuration 1000A and unclamped configuration 1000B, respectively. In the clamped configuration 1000A, the traveler 1012 is away from the fork. In the unclamped configuration 1000B, the traveler 1012 is near the fork.

The end effector may include a top clamp 1002, a bottom clamp 1004, a top clamp arm 1006, a bottom clamp arm 1008, a ball-detent clutch 1010, a traveler 1012, a shifter carriage 1014, a drive motor 1016, a gear box 1018, a camera mount 1020, a camera 1022, a friction plate 1024, a pneumatic actuator 1026, a drive gear 1028, and a clamp carriage 1030. The drive motor 1016 provides power to transition between the clamped configuration 1000A and the unclamped configuration 1000B of the end effector. The ball-detent clutch 1010 engages or disengages a drive gear 1028 coupled to the gear box 1018 to cause or stop movement of components of the end effector. When the ball-detent clutch 1010 is engaged, the gear box 1018 and the drive gear 1028, via the pneumatic actuator 1026, causes rotation of a ball-end hex drive shaft 1032 and moves the traveler 1012 about the length L of the end effector along the ball-end hex drive shaft 1032. When the traveler 1012 is outside of the shifter carriage 1014, the end effector is in the clamped configuration 1000A. Based on the position of the traveler, force is applied to the friction plate 1024 to cause movement of at least the top clamp 1002 and the bottom clamp 1004, relative to each other and the clamp carriage 1030. When at least a portion of the traveler 1012 is inside the shifter carriage 1014, the end effector is in the unclamped configuration 1000B. The camera mount 1020 is configured to support a camera 1022 approximately parallel to the length of the top clamp 1002 and the bottom clamp 1004 in a position in which a view of the camera includes the top clamp 1002 and the bottom clamp 1004. In this position of the camera 1022, a view is provided that includes the top clamp 1002 and the bottom clamp 1004, relative to a mechand to be coupled to the end effector 1000A, 1000B.

A static fork mounted to the body of the end effector enables the end effector to angle the top clamp 1002, top clamp arm 1006, bottom clamp 1004, and bottom clamp arm 1008 into the clamped configuration 1000A and unclamped configuration 1000B to engage and disengage with a body of a mechand. As part of the end effector clamp engagement, a ball-end hex drive shaft 1032 may be extended to mate with the mechand axle. A clamping force may be produced between the top clamp 1002 and the bottom clamp 1004 by a mechanism of the end effector.

The end effector may include a camera mount 1020 for a camera 1022 (e.g., a Logitech webcam) and may drive the mechand to complete gladhand mating process. The end effector may be the link between the mechand connector and the gross movement system. The end effector may include a variety of functions. For example, the end effector may mechanically index with the mechand body when unconnected in a manner that corrects for a given positional error of the gross movement system. Additionally or alternatively, the end effector may apply torque to the mechand drive axle through a drive shaft. This shaft reliably engages as part of the mechand/end effector gripping process. In another example, the end effector may provide a stable platform for translational movement of the mechand and mechanical indexing on the geometry of the trailer gladhand.

The end effector may allow a compact reactive system that leverages a clutched torque limiting clamp system. The end effector may include a compact drive motor 1016 with multiple limit switches to place the mechanized gladhand into position. The end effector may be used to properly align and couple the gladhand to its mating half and complete the hose interlocking process. The end effector may also perform the reversed process (e.g., de-couple the gladhand from a second mating surface). The end effector may include a clutching system that allows the engagement of the tool. The end effector may have a single, compact motor that may be used for multiple applications, including gripping and activating the tool (e.g., gladhand). The end effector may have a fork and clamp design to secure and/or couple to the hose. The end effector may include a precise force and movement control with limit switches.

Advantages of the end effector may include using the drive motor 1016, clasping tool, and/or driving installed tool in multiple applications. Additionally or alternatively, the end effector may include a mechanical clutch 1010 for properly engaging the tool. The end effector may have a compact design with precise control.

As described herein, the end effector may include a drive motor 1016. The drive motor 1016 may be an electric motor, pneumatic motor, hydraulic motor, or any other type of motor. In an example, the end effector may include a single electric motor. The motor may have a small inline gear box 1018 and a shifter carriage 1014 to direct power to either the drive (e.g., via the drive gear 1028) and/or clamping mechanisms. Control input may be minimal; motor power may be on/off with a single rotary encoder, and the state of the system may be tracked through a series of limit switches. The end effector system may be compact enough to be mounted on a short-travel tilt axis, allowing compensation for non-vertical trailer gladhands. The entire system may mount with a four-bolt pattern on a single plane, providing flexibility for mounting to a future gross movement system.

Figure 11:
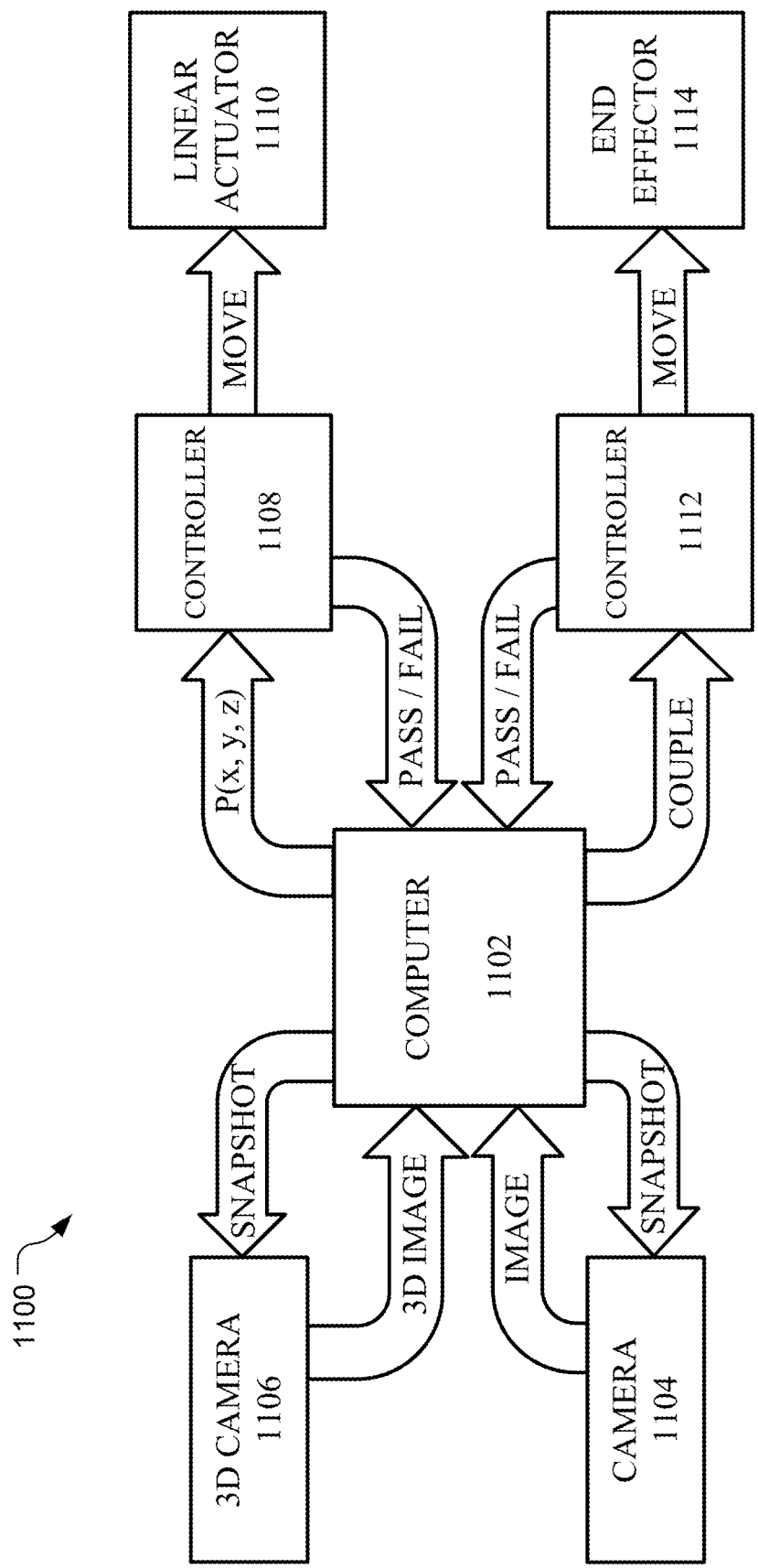
FIG. 11 depicts a diagram of an example system architecture and control.

FIG. 11 depicts a diagram of an example system 1100 for architecture and control. In an example, the system architecture includes a computer 1102 that may perform computer vision processing and/or a main script for the control system 1100. As shown in this example system 1100, two cameras may be used to take images and provide image data to the computer 1102 for processing. Based on the image processing, instructions and/or information is sent to a controller 1108 to control the linear actuator 1110 (e.g., further described with respect to FIGS. 8A-8D) and sent to a controller 1112 to control the end effector 1114.

In an example, the controller 1108 to control the linear actuator 1110 is a Raspberry Pi® 3 Model B, which controls stepper motor drivers for the linear actuator using a Windows® PC running Python libraries PIGPIO and PIZERO. This example allows for integration of the computer 1102 with the computer vision processing code with control of the linear actuator 1110, including positional feedback on forward and backward motion from the computer 1102 implementing the vision system. In another example, the controller 1112 may be an Arduino® UNO. The controller 1112 may include a microcontroller (e.g., ATmega328P), digital I/O pins (e.g., 14 pins), and/or analog input pins (e.g., 6 pins). The controller 1112 may control an end effector (e.g., the end effector described in FIGS. 10A-10J) to position and rotate a gladhand or mechand (e.g., described in FIGS. 9A-E). The controller 1112 may use data provided by a computer 1102 and other sensors to perform the necessary movements to make a gladhand coupling. A direct current (DC) motor on the end effector may be controlled using a quadrature encoder and several limit switches to provide responsive positional feedback for the system.

An example procedure for utilizing a single linear actuator to perform the gladhand coupling process may include the following steps: (1) air supply activated (100 PSI); (2) electric supply powered on (12V, 10 A); (3) primary computer vision system takes a snapshot that generates a 3D image used to identify and locate the gladhands; (4) primary computer vision system then locates the end effector, if unsuccessful, the end effector moves forward slightly and the process is repeated until successful; (5) the position of gladhands are sent to a processor, which signals a linear actuator to move the end effector; (6) secondary camera system is activated and takes a snapshot locating the center of the gladhand's gasket; (7) the processor sends a signal to a linear actuator to move the end effector to the required location as provided by the secondary camera system mounted to the end effector; (8) the computer signals the end effector controller to start the sealing process, engaging the end effector; (9) when the connection is complete, the end effector controller returns an all clear signal; and (10) the actuator controller returns the end effector to a retracted position away from the mounted gladhand by adjusting the linear actuator.

Figure 12:
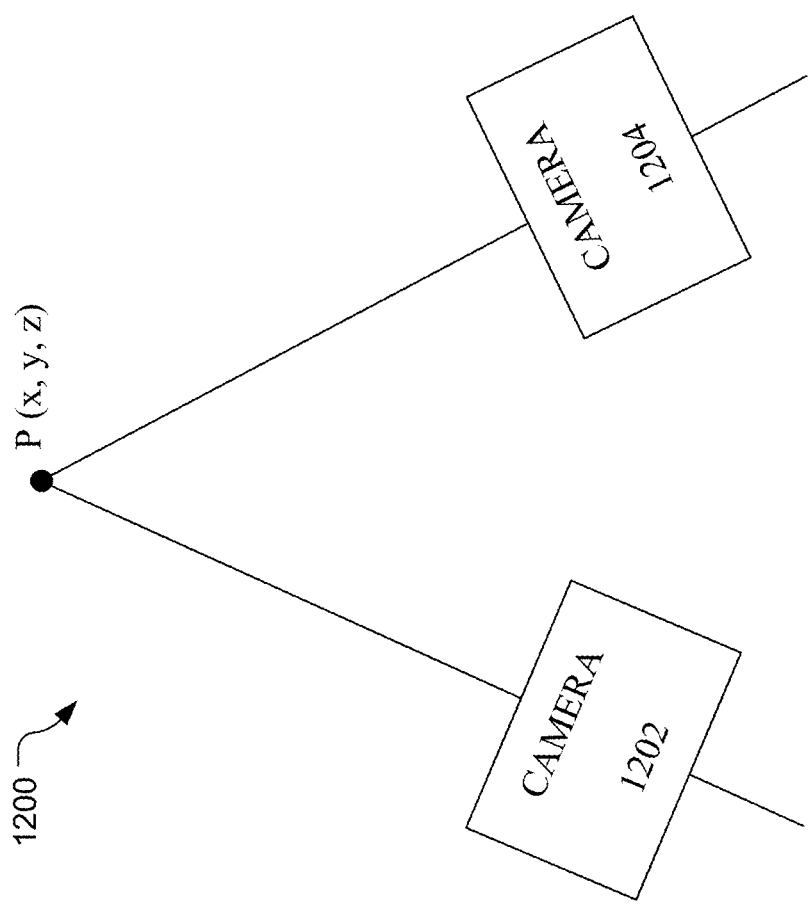
FIG. 12 shows an example setup of two cameras.

FIG. 12 shows an example camera setup 1200 of two cameras. The camera setup 1200 shows a stereo vision setup for a pinhole camera. Stereo vision is a technique that generates 3D depth information using a pair of cameras 1202, 1204 with similar properties mounted a known transformation apart from one another. The two cameras may capture the same scene from different perspectives at the same time. For a basic pinhole camera, a point in space may be projected onto the camera's image plane by going through a camera's optical center. The possible depth of a pixel may be anywhere on the projection line from the point to a camera's optical center. To figure out the appropriate depth every pixel from one camera may be matched to image pixels in the other camera. Then theoretical lines of projection may be made originating from each camera's optical center that goes through the matched point. The intersection P of these projected lines is the location of the coordinate in space. Then, using the transformation between the two cameras, three side lengths of a triangle formed between the intersection P and the two cameras may be used to calculate an object's depth.

Figure 13:
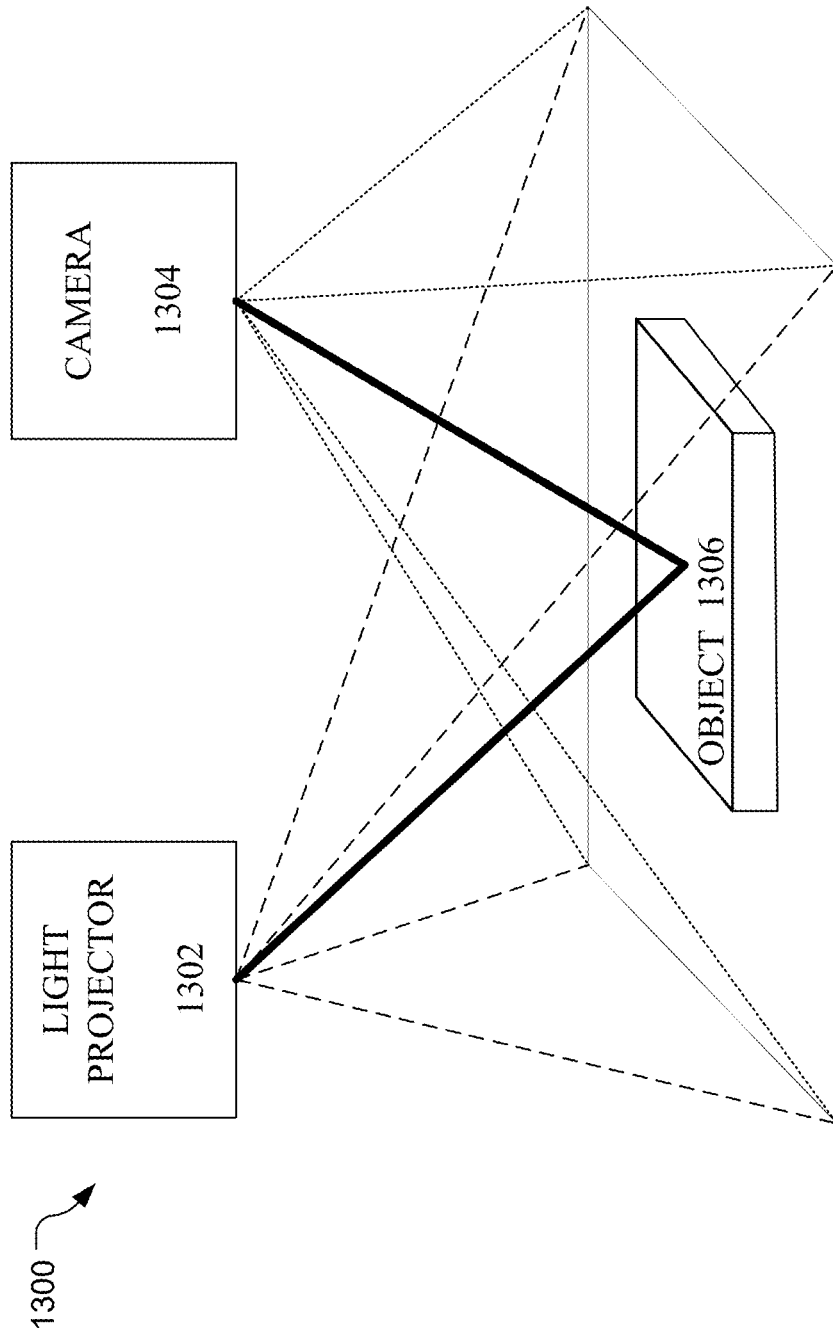
FIG. 13 shows an example setup of a light projector and a camera.

FIG. 13 shows an example setup 1300 of a light projector 1302 and a camera 1304. The setup 1300 shown in FIG. 13 is an alternative to the setup described in FIG. 12 to derive a depth of an object. Similar to a stereo vision setup, a structured light setup 1300 uses two sensors. One of the sensors is offset at a known distance from the other. Instead of using two cameras, however, this setup 1300 uses a light projector 1302 emitting a known light pattern and one camera 1304. By projecting a known light pattern onto a surface of an object 1306 and capturing that pattern with the camera 1304, a shape of an object's surface may be determined. If the light pattern detected by the camera 1304 is the same as the light pattern emitted from the light projector 1302, then the surface of the object is flat. If, however, the surface is not flat, then the light pattern may become distorted when captured by the camera.

FIG. 14A shows an example point of view ("POV") 1400A of a first camera and FIG. 14B shows an example point of view 1400B of a second camera. In an example, the first POV 1400A is captured by a camera mounted on the back of a cab (e.g., with camera mount 700) and the second POV 1400B is captured by a camera mounted on the end effector (e.g., with camera mount 1020).

Referring to FIG. 14A, the first POV 1400A (e.g., of a primary camera system) shows an emergency gladhand 1402, an electrical box 1404, and a nominal gladhand 1406. FIG. 14B shows the POV from a secondary camera substantially parallel to the primary camera and showing the emergency gladhand 1402.

The stereo view of the two cameras, as further described with respect to FIG. 12 may be used with the vision control system of FIG. 11 to identify and localize the emergency gladhand 1402 to position the end effector. Identification of the gladhand(s) includes determining an outline of the Gladhand(s). Localization determines the position or coordinates of the gladhand(s). The computer implementing image processing may be capable of performing image analysis via machine learning and/or via datasets of gladhand images. In an example, computer vision may process, segment, identify, and localize the gladhand from a depth map and colored images produced by a camera.

The localization algorithm of the gladhand geometry may be broken down into steps. For example, the steps may include (1) camera calibration, (2) pre-processing: gabor texture filter, (3) search for elliptical/circular objects, (4) depth calculation (estimation), and (5) deprojection of pixel to world coordinates. The camera calibration step may be used to gather coefficients relating to the camera's intrinsic and extrinsic properties. Factors of intrinsic and extrinsic properties include distortion coefficients, principal point, and camera focal length.

At least one of the cameras may be a camera capable of creating a 3D rendering of a scene in an outdoor environment. In an example, the camera may be an Intel® RealSense® D435. In another example, the camera may be accurate up to 10 meters. The camera may have a variety of technical specifications. For example, the camera may include a depth sensing range, an RGB resolution and framerate, a depth resolution, a depth field of view, an RGB field of view, physical camera dimensions, and a connector. In an example, the camera may have the following specifications: a depth sensing range of 0.1-10 m, an RGB resolution and framerate of 1920×1080 FPS, a depth resolution of 1280×720, a depth field of view of $87°±3°×58°±1°×95°±3°$, an RGB field of view of $(69.4°×42.5°×77°±3°$, physical camera dimensions of 90 mm×25 mm×25 mm, and a USB-C 3.1 connector. In another example, the camera may utilize stereo vision technology and structured light to calculate depth within an image of the camera. In a further example, the camera may be equipped with an IR projector, two stereo modules, and an RGB camera sensor. The camera may be capable of performing in both indoor and outdoor environments up to a range of 10 m. The primary camera system may use Intel's RealSense D435 depth camera. Utilizing a combination of structured light and stereo vision techniques a 3D image can be generated from the scene. In the example provided above, the RealSense® projects an infrared pattern onto objects and measures the disparity between the two depth sensors to generate a depth map/ image. The images produced can then be transformed and overlayed onto images captured from the RGB sensor. A more detailed description of stereo vision and structured light is included above in discussions of FIGS. 12 and 13.

An example of a secondary camera is a Logitech® Webcam C930E. The secondary camera system may act as a terminal guidance sensor. The secondary camera may examine the gladhand at a much closer range than what is capable for a 3D camera, or depth sensor on the primary camera. As an alternative, other cameras may be used. As another alternative, software may locate the contact point on the gladhand.

Camera selection may include several factors, such as sensing max/min range, cost, flexibility, outdoor durability, and developer support. The present technology may use a depth map from a distance between 30"-42", which would span a truck's workspace.

Figure 15C:
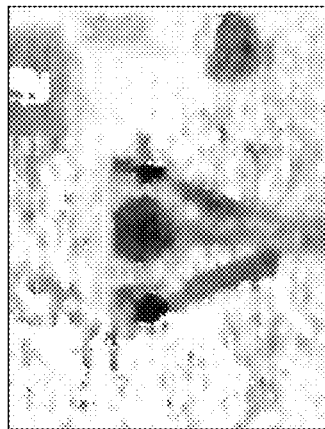
FIGS. 15A-15I show images that may be included in the identification and localization process performed on an image taken by a camera.
Figure 15F:
Figure 15I:
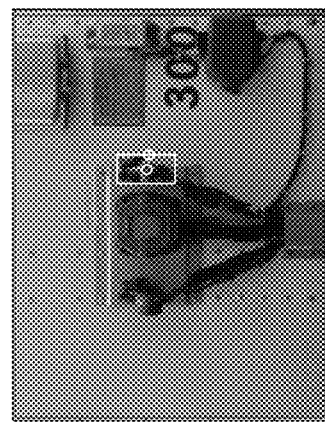
Figure 15B:
Figure 15E:
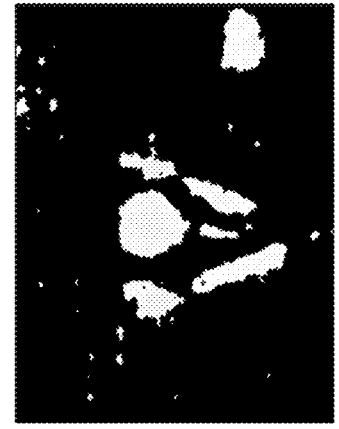
Figure 15H:
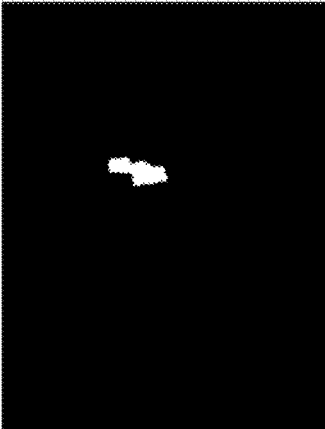
Figure 15A:
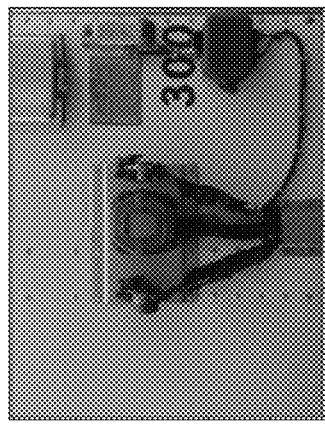
Figure 15D:
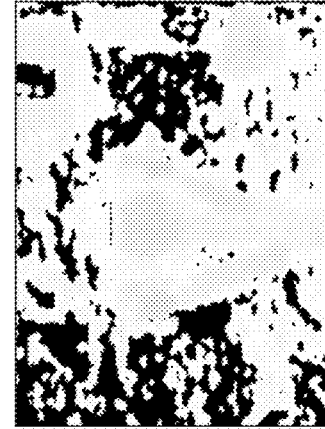
Figure 15G:
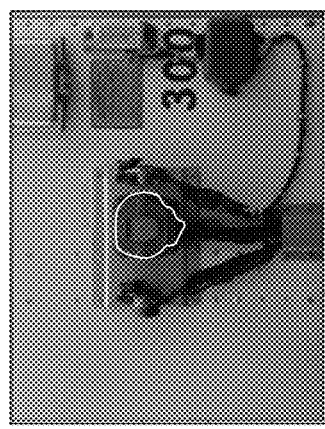

FIGS. 15A-15I show images which may be included in the identification and localization process performed on an image taken by a camera. An image may be 2D or 3D. FIG. 15A shows an original color image. FIG. 15B shows a raw depth map of the original color image. FIG. 15C shows a back/foreground of the original color image. FIG. 15D shows a mode depth removal of the original color image. FIG. 15E shows an iterative pixel removal of the original color image. FIG. 15F shows a morphological filter of the original color image. FIG. 15G shows an electrical box identification in the original color image. FIG. 15H shows a contour classification of the original color image. FIG. 15I shows a point estimation identification of the original color image. An identification algorithm can be broken down into three main steps, including a pre-processing of depth map to remove noisy data; a pixel iteration and morphological filtering to find the foreground; and a contour classification to differentiate blobs and shapes.

A 3D image generated by a camera may be distilled down to the contours of the gladhands, electrical box, and other miscellaneous components remain in the image. The contours may be classified based on their image properties and physical parameters, to differentiate between the emergency gladhand and other components (e.g., the electrical box).

The depth information collected may not be accurate. For example, the large black swaths and speckled black holes in FIG. 15B represent null data. Null data could be caused by sharp changes in depth, occlusion of one or more depth sensors, varying ambient lighting interfering with camera exposure, or misrecognition of the projector pattern. In addition, smooth surfaces also may have slight variations in their depth readings and may require further manipulation.

In an example, processing the images from a 3D camera may include one or more assumptions. For example, an assumption may include a shape of the surface on which the gladhand is mounted. For example, the gladhand may be mounted to a flat surfaces (e.g., a trailer that is flat and rectangular as viewed from back of the cab). This assumption relates to whether or not the trailer has a uniform depth relative to the camera. As another example, an assumption may be related to a mounting location of the camera. For instance, an assumption may include that the camera's mounting location has been chosen so the field of view is composed of mainly the back of the trailer. In this example, the back of the trailer may be the largest object within the camera view. In an example, there may be an assumption that the trailer is at a uniform depth the depth measurement occurring most often will be that of the trailer, such that any depth measurement with this value or farther away can then be ignored. As a further example, an assumption may be related to how far the gladhand protrudes from the trailer. For example, the gladhand may protrude about 4" from the back of the trailer, plus or minus the height of any additional plate it could be mounted on. In an example where the working distance is at 42", any object closer than 36" is unlikely to be the gladhand and may also be removed. Another assumption any configuration of vehicle, trailer, and gladhand may be considered. For example, gladhands of different shapes, locations, or dimensions may be considered when making assumptions. Additionally, assumptions may be related to the type of trailer, such as a box trailer, tanker, flat bed trailer, or any other trailer type.

After the above steps have been performed, the image may appear similar to FIG. 15D. Further processing may be performed. The remaining objects are of known sizes and take up a consistent amount of pixels each time. The maximum depth in the image is then reduced in small increments (e.g., 1 mm) until only a certain number of pixels remain. What remains are objects closest to the camera, such as what is shown in FIG. 15E, including the gladhands, electrical box, and hoselines, along with some noise.

Due to close proximity of the objects, some of the contours are conjoined as singular entities. To separate the contours into individual unique objects, morphological filters may be applied to the remaining entities. Morphological filters work to reduce noise in an image by manipulating a binary image based on its shape. A variety of morphological operations may be used, for example, morphological operators may include erosion and dilation. Where foreground objects are represented as white and background objects are black.

The erosion operation removes pixels at the boundary of foreground objects tightening up objects in the image and also works to remove any lone specks. Erosion also helps differentiate objects in close proximity, by separating closely connected contours, such as the hoses connected to the gladhands.

Dilation may follow erosion. Shrinking the foreground objects may remove some noise in the image and help separate objects of interest, but it also alters their physical size. To properly identify the gladhand, the image needs to be as close as possible to its actual proportions. The dilation operator counteracts this by expanding the foreground objects. The noise removed from erosion may not reappear in the image and the objects may still be kept separate. What remains are blobs of the foreground objects, such as those shown in FIG. 15F.

The next few steps focus on differentiating between the contours. In an example, a variety of components may be identified. For example, in FIG. 15G, the emergency gladhand (e.g., the gladhand on the right side of the image), the left-hand gladhand, and the electrical box are each identified. In FIG. 15G, the electrical box can be readily identified due to its hexagonal contour. Searching over all the contours the perimeter, the area of each contour is recorded. Using the equation for a hexagon, a theoretical area can be calculated and compared to the one recorded in the image. This equation may be limited to use with hexagonal shapes (e.g., the electrical box) for the trailer.

To classify the contours, a variety of approaches may be considered. For example, two approaches include (1) Hu Image Moments, and (2) Electrical Box Detection. In the Hu Image Moments approach, the classification method may be based on the gladhand configuration. The camera may be mounted on the back of the cab and capture multiple sets of images of gladhand configurations. The images may undergo image processing steps outlined herein. Features called Hu Image Moments may then be extracted and recorded for each contour.

Hu Moments are seven numbers that may include scale, rotation, translation, and reflection invariant, meaning if the image is shifted, rotated, enlarged, or flipped it may still have the same Hu Moments. Using a set of around 180 images, the Hu Moments, area, perimeter of each foreground object may be calculated. Using the mean and standard deviation for each value, shape moments may be compared.

Additionally or alternatively to the Hu Moments, the electrical box method may be used. For example, the electrical box method may be used selectively, as a determining factor, where Hu Moments are similar between different shapes. In an example where the gladhands are roughly at the same height of the electrical box, the centroids of each contour may be checked to see if they had roughly the same y value. In that example, the Hu Moments may be matched to see if the right-hand gladhand was found.

Figures 16A, 16B, 16C, 16D:
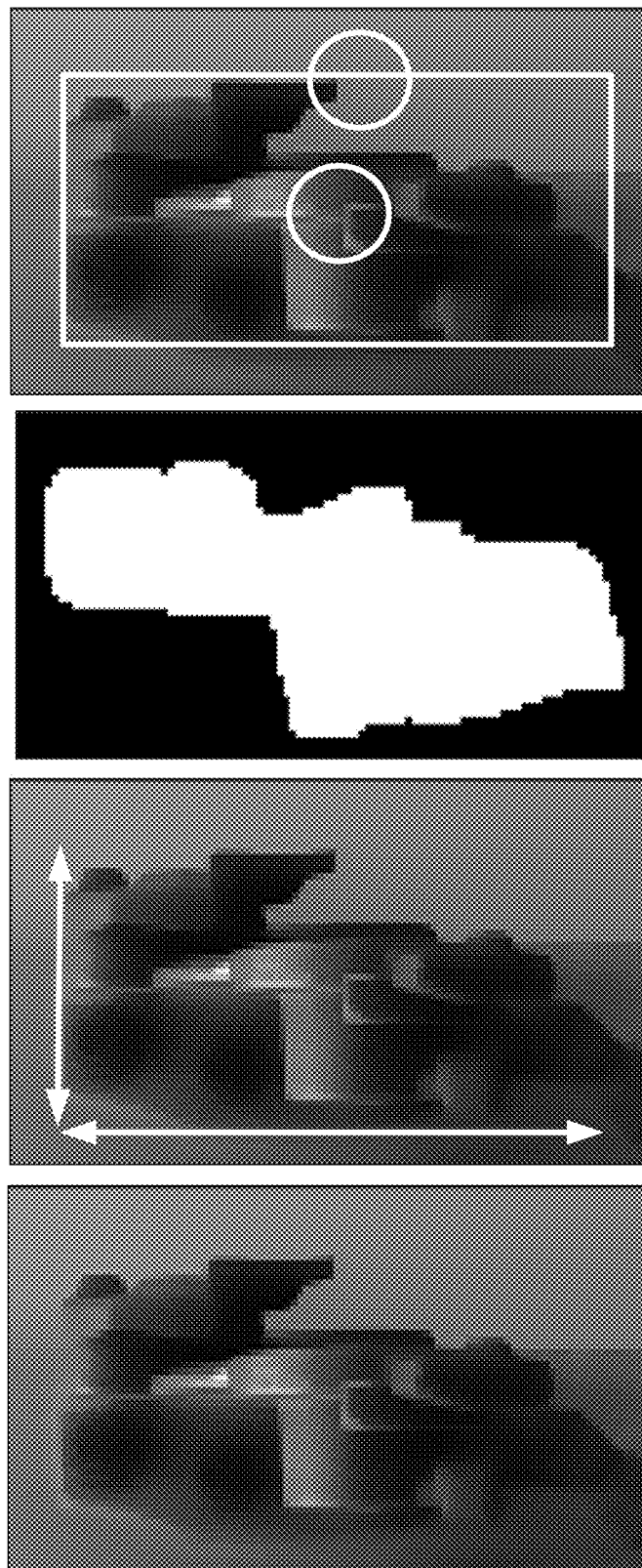
FIGS. 16A-16D show example image processing steps.

FIGS. 16A-16D show example image processing steps. FIG. 16A shows an original color image, FIG. 16B shows the original color image height and width to determine an aspect ratio, FIG. 16C shows the gladhand contour, and FIG. 16D shows point estimation with a bounding box. The identified emergency gladhand contour is then be localized. In FIG. 17A, the sealing surface of is identified, as indicated by the dashed line 1702. Although a dashed line is shown in FIG. 17A, an indicator may be provided, such as a green circle around the identified sealing surface. An approximate contact point may then be mapped from 2D image coordinates to 3D world coordinates.

From the identified contour (e.g., the sealing surface), the gladhands have a specific geometry that may directly translate over to the image. For a sufficient contour, a center 1704 of the contour is also identified. The objects' aspect ratio, the ratio of the width of the object over its height, may be used to approximate a point that may be projected where the secondary camera system may be repositioned.

Figure 17B:
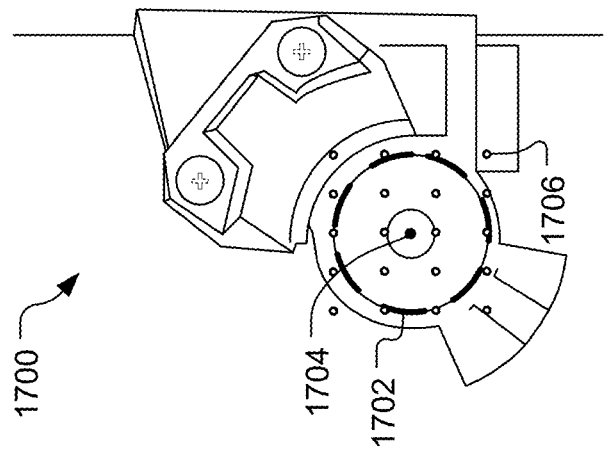
FIGS. 17A-17B show additional example image processing steps.
Figure 17A:
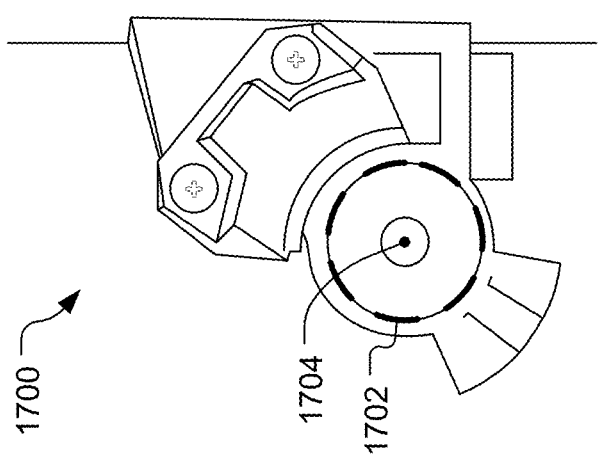

FIGS. 17A-17B show additional example image processing steps. FIG. 17A shows a center dot 1704, in the circle identifying the sealing surface 1702, to represent the point needed to be mapped from 2D image coordinates to 3D world coordinates relative to the camera. FIG. 17B shows dots 1706 scattered about the identified gladhand 1700 to illustrate possible 3D points calculated from the primary camera system for a possible location of the contact point. The primary camera may find an approximate location of the contact point (e.g., center dot 1704 in FIG. 17A), and may forward its position to the computer. An example of possible points the primary system calculates are represented by the dots 1706 in FIG. 17B. The computer may calculate how far away the contact point is relative to the camera's center and may maps the 2D image coordinates to 3D world coordinates. The coordinates may be provided to the computer via a feedback loop, and the belt drive may make adjustments to align the end effector.

Figure 18:
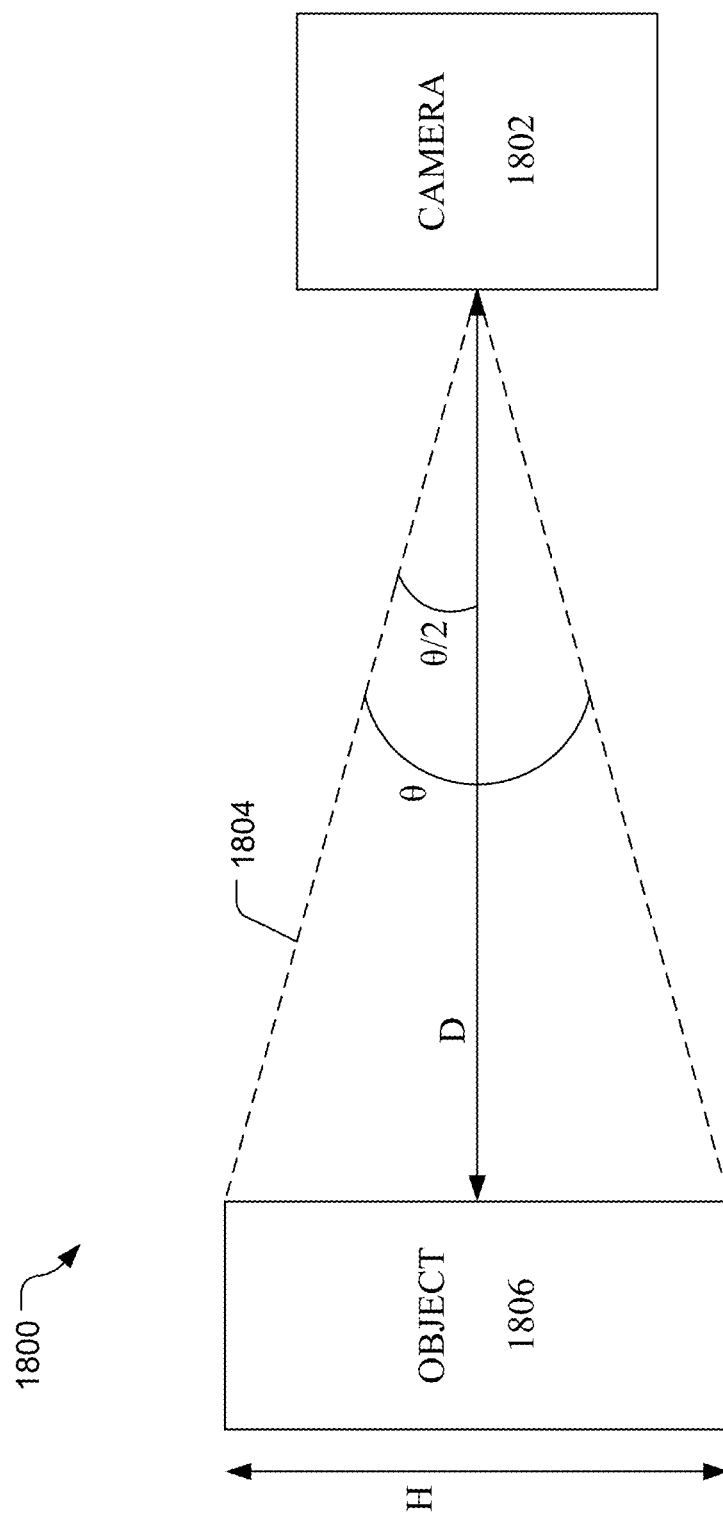
FIG. 18 shows an example camera setup.

FIG. 18 shows an example camera setup 1800. As shown, the setup 1800 shows a camera 1802 with a field of view 1804 de-projecting image points to real-world 3D points P(X,Y,Z). The camera may be capable of calculating the depth of an object in space, however, the camera may also be capable of calculating (X,Y) coordinates as well. For example, a center 1704 identified in FIG. 17A can be deprojected from image coordinates to real-world coordinates using the camera's known field of view and the depth of the gladhand.

Using geometry, if an accurate depth measurement is known, then an object's' height may be calculated using the vertical field of view ("FOV") from the technical specifications from the camera. The below equation may be used to calculate a height of an object for a given FOV and depth:

$$\text{Object Height} = \tan\left(\frac{FOV}{2}\right) * Depth, \ FOV = \theta$$

In an example, the object is the entire image frame and it is assumed the object is a flat wall at a specified depth. Using the above equation, the length and width of the entire image frame may be calculated in real-world units. For a given image resolution (e.g., 640, 480), a ratio can be generated of length per pixel in a particular orientation. For example, at a set distance of 0.9 m and a FOV of 45 degrees, the height of the image frame is 0.37 m. If the image resolution is (640, 480) then the ratio of length per pixel is 0.37 m/480 px or every pixel has a height of $7.7e^{-4}$.

Using this length per pixel ratio, every pixel's location as a point in space can be measured relative to the camera's optical center, assumed to be one half of its image resolution. The camera's optical center is also de-projected to be in real-world coordinates. The result is a point in space measured as a distance D from the camera 1802 to the object 1806.

The image pixel representing the point of contact can be projected from image plane to real-world coordinates relative to the camera. The depth of the object (in pixels) is used to complete the 2D to 3D mapping. A pixel from a non stereo-vision camera may be calculated based on a scaling factor known from objects within the scene. The gladhand's gasket diameter may be measured. For example, the gladhand's gasket may have a diameter of roughly 39 mm. Using the major axis calculated in the previous step as the object's height in units of pixels and the camera's focal length in pixels the depth can be calculated using the following equation:

$$\text{Depth} = \text{Object(mm)} * \frac{\text{focal length}(px)}{\text{object height}(px)}$$

The following equations can be used to calculate the 3D real-world coordinates of an object for a pinhole camera, assuming there is no lens distortion, where X,Y,Z are 3D real-world coordinates, u and v are image coordinates, and fx,fy is the image focal length, cx,cy is the principal point from the camera matrix, and Z is the depth.

$$X = \frac{Z}{f_x}(u - c_x)$$

$$y = \frac{Z}{f_y}(v - c_y)$$

The image distortion may be taken into account to calculate a more precise measurement for the object's real-world coordinates. FIGS. 20A-20C include further discussion about distortion and distortion correction.

FIGS. 19A-19G show example applications of one or more gabor filters on an image. An image is thresholded by using an adaptive bilateral threshold on the gabor filter image or by using a morphological filter on the adaptive bilateral threshold image. Using similar techniques to those described above for image processing, the thresholded image undergoes erosion and dilation to remove noise. For the secondary camera, a kernel or structuring element may be used to highlight circular shapes within the image to locate a contact point within the circular ring of the gladhand and preserve elliptical/circular objects.

Contours may be located in the threshold image. In an example, the contours may be used to determine how far the mechand and end effector are out of alignment with the trailer gladhand. For example, an ellipse may be fit over each contour, calculating its center and major and minor axis. Since the gladhand port is approximately a circle, a theoretical area may be calculated from the elliptical parameters. The below equation may be used to calculate the theoretical area of the elliptical gladhand port approximated as a circle:

$$\text{Theoretical Area} = \frac{\text{Major Axis}}{2} * \frac{\text{Minor Axis}}{2} * \pi$$

The theoretical area may be cross referenced to the contour's actual area to compare how well an ellipse approximates the contour. An ellipse may correspond with, or associated with, the gladhand's pneumatic port.

Figures 19A, 19B, 19C:
FIGS. 19A-19G show example applications of one or more gabor filters on an image.
Figures 19F, 19G:
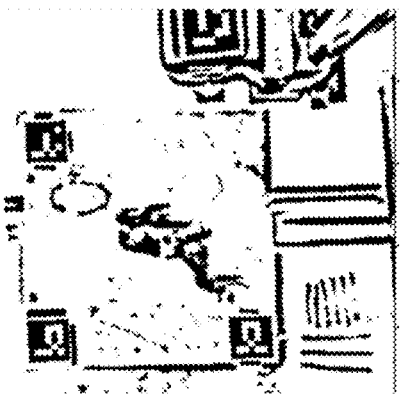
Figures 19D, 19E:
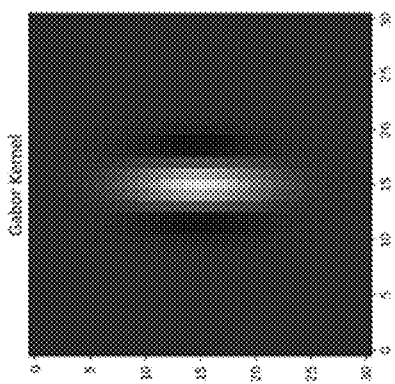

FIGS. 19A-C show a gabor filter (FIG. 24A) applied to an image to create a texture image (FIG. 19B) that is then thresholded (FIG. 19C), where maximum values (shown in black), indicate a change in texture/edges. The gabor filter of 0 degrees targets edges with vertical orientations. FIGS. 19D-F show a gabor filter (FIG. 19D) applied to an image to create a texture map (FIG. 19E) that is then subjected to a threshold (FIG. 19F). The above gabor filter of 90 degrees targets edges with horizontal orientations and produces an edge map seen in FIG. 19F.

The gabor filter may be an orientation-specific filter used for texture analysis in applications such as edge detection and feature extraction. When used in image processing, the gabor filter returns maximum values at locations with texture changes. The parameters can be modified to target changes in texture along a specific orientation. For example, in FIG. 19A and FIG. 19D, a specified orientation of 0 degrees and 90 degrees, respectively, may find vertical edges. As shown in FIG. 19C, the threshold image of the vertical gabor filter shows defined edges with vertical orientation. Similarly, in FIG. 19F, the gabor filter of 90 degrees may target horizontal edges. In FIG. 19F, now the filter may identify edges in the horizontal direction.

These filters can be combined so that a robust edge detection can be made to find edges of objects of varying size, shape, and surface in all directions. For example, FIG. 19G shows a combination of several gabor filters to allow for edge detection to take place along multiple directions, which can help retrieve and edge map. In FIG. 19G, 16 different orientations were used to capture the edges in the scene. The gabor filter may be applied to weight each pixel value depending on the scene's textures/edges. Then the image may be bilaterally blurred, to preserve edges, and threshold.

FIGS. 20A-20C show rectilinear projection and various forms of image distortion. Distortion occurs due to the camera lens not being perfectly aligned. This causes a deviation from perfect rectilinear projection 2000A, which is where straight lines appear to be straight in an image. Distortion may morph straight lines to appear to be bent. A perspective comparison between distorted and undistorted images is shown in FIGS. 20A-20C. As an example, types of distortion include tangential distortion 2000B and radial distortion 2000C. Radial distortion 2000C may make straight lines appear to buckle the farther away they are from the center of the image. Tangential distortion 2000B may make objects appear nearer than they actually are. The tangential and radial components of lens distortion can be corrected for using what is called the Inverse Brown Condray method. The equations to calculate image distortion using the Inverse Brown Condray method are as follows:

$$x = \frac{u - pp_x}{f_x}$$

$$x = \frac{v - pp_y}{f_y}$$

$$\text{radial distortion coefficient} = 1 + k_1 x^2 y^2 + k_2 x^4 y^4 + k_3 x^6 y^6$$

$$x_{corrected} = (x * \text{radial}) + (2 p_1 xy) + p_2 (x^2 y^2 + 2x^2)$$

$$y_{corrected} = (y * \text{radial}) + (2 p_2 xy) + p_1 (x^2 y^2 + 2y^2)$$

$$X = D * x_{corrected}$$

$$Y = D * y_{corrected}$$

$$Z = D$$

Where the distortion coefficients are $k_1$, $k_2$, $k_3$, $p_1$, $p_2$, the principal point is at $pp_x$, $pp_y$, and the focal length is $f_x$, $f_y$. From the camera calibration the focal length, principal point, and distortion coefficients may be derived. Using the above equations, the world coordinates of the point of contact may be calculated. These numbers may be relayed to the computer and the system may be re-adjusted or re-positioned to better align the end effector with the contact point (e.g., a mating position).

Figure 21:
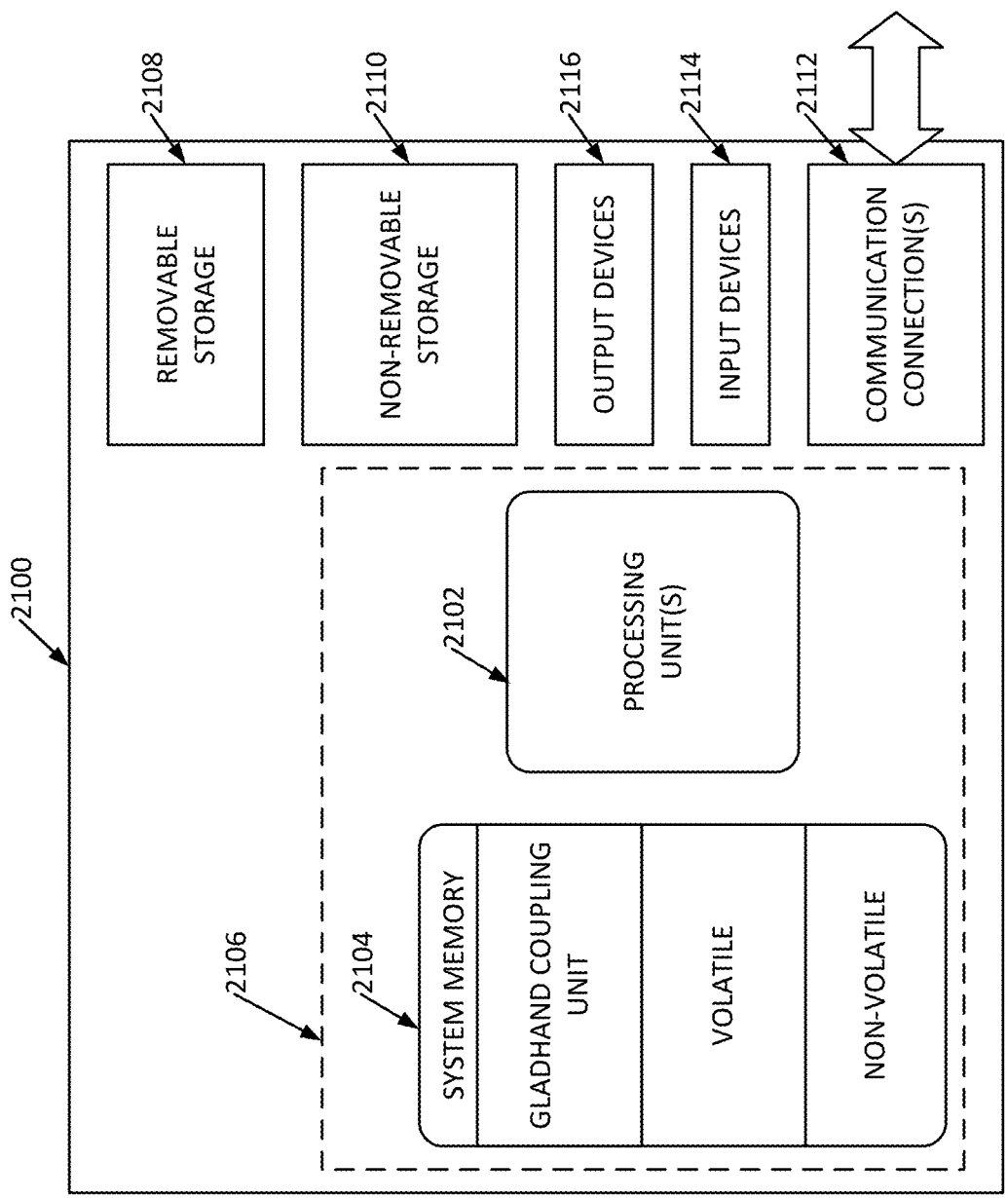
FIG. 21 illustrates an example of a suitable operating environment in which one or more of the present embodiments may be implemented.

FIG. 21 illustrates an example of a suitable operating environment 2100 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 2100 typically may include at least one processing unit 2102 and memory 2104. Depending on the exact configuration and type of computing device, memory 2104 (storing, among other things, APIs, programs, etc. and/or other components or instructions to implement or perform the system and methods disclosed herein, etc.) may be volatile (such as RAM), non-volatile (such as ROM, flash memory, etc.), or some combination of the two. This most basic configuration is illustrated in FIG. 21 by dashed line 2106. Further, operating environment 2100 may also include storage devices (removable, 2108, and/or non-removable, 2110) including, but not limited to, magnetic or optical disks or tape. Similarly, environment 2100 may also have input device(s) 2114 such as a keyboard, mouse, pen, voice input, etc. and/or output device(s) 2116 such as a display, speakers, printer, etc. Also included in the environment may be one or more communication connections, 2112, such as LAN, WAN, point to point, etc.

Operating environment 2100 may include at least some form of computer readable media. The computer readable media may be any available media that can be accessed by processing unit 2102 or other devices comprising the operating environment. For example, the computer readable media may include computer storage media and communication media. The computer storage media may include volatile and nonvolatile, removable and non-removable media implemented in any method or technology for storage of information such as computer readable instructions, data structures, program modules or other data. The computer storage media may include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. The computer storage media may not include communication media.

The communication media may embody computer readable instructions, data structures, program modules, or other data in a modulated data signal such as a carrier wave or other transport mechanism and includes any information delivery media. The term "modulated data signal" may mean a signal that has one or more of its characteristics set or changed in such a manner as to encode information in the signal. For example, the communication media may include a wired media such as a wired network or direct-wired connection, and wireless media such as acoustic, RF, infrared and other wireless media. Combinations of the any of the above should also be included within the scope of computer readable media.

The operating environment 2100 may be one or more computers operating in a networked environment using logical connections to one or more remote computers. The remote computer may be a personal computer, a server, a router, a network PC, a peer device or other common network node, and typically includes many or all of the elements described above as well as others not so mentioned. In an example, the operating environment may include one or more vehicle controllers and/or processors associated with the vehicle or truck. The logical connections may include any method supported by available communications media. Such networking environments are commonplace in offices, enterprise-wide computer networks, intranets and the Internet.

The different aspects described herein may be employed using software, hardware, or a combination of software and hardware to implement and perform the systems and methods disclosed herein. Although specific devices have been recited throughout the disclosure as performing specific functions, one skilled in the art will appreciate that these devices are provided for illustrative purposes, and other devices may be employed to perform the functionality disclosed herein without departing from the scope of the disclosure.

As stated above, a number of program modules and data files may be stored in the system memory 2104. While executing on the processing unit 2102, program modules (e.g., applications, Input/Output (I/O) management, and other utilities) may perform processes including, but not limited to, one or more of the stages of the operational methods described herein.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the operating environment 2600 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The embodiments described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure. In addition, some aspects of the present disclosure are described above with reference to block diagrams and/or operational illustrations of systems and methods according to aspects of this disclosure. The functions, operations, and/or acts noted in the blocks may occur out of the order that is shown in any respective flowchart. For example, two blocks shown in succession may in fact be executed or performed substantially concurrently or in reverse order, depending on the functionality and implementation involved.

Figure 22:
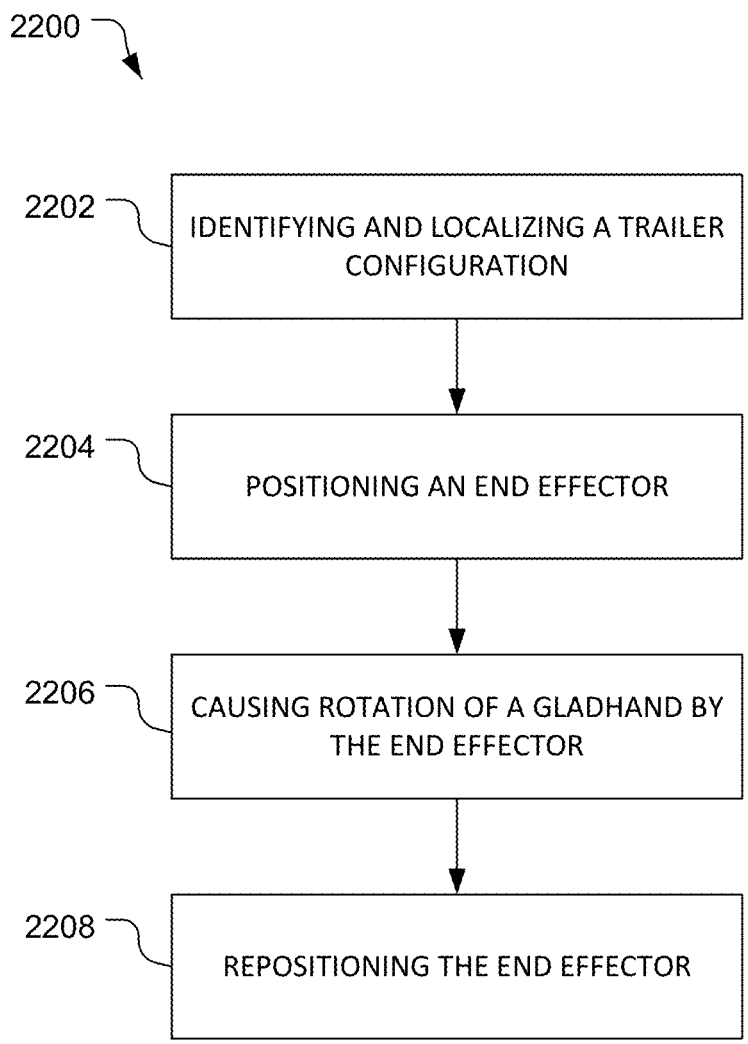
FIG. 22 depicts an example method for automated gladhand coupling.

FIG. 22 depicts an example method 2200 for automated gladhand coupling. The method may be performed using the technology further described above. For example, the systems described above may be used to accomplish method 2200. Method 2200 begins at operation 2202, where a trailer configuration is identified and localized. As further described herein, one or more cameras may be used to identify a gladhand connection site on the trailer (e.g., using one or more image processing techniques and one or more images described above). The real-world coordinates of the trailer configuration, such as a gladhand connection site or an electrical port, are determined based on the image processing.

At operation 2204, an end effector is positioned. The position of the end effector may be adjusted by using one or more linear actuator assemblies described herein. The end effector may be positioned based on the real-world coordinates determined for the identified and localized trailer configuration. The position of the end effector may continue to be adjusted based on feedback from one or more of the image processing techniques described with respect to operation 2200 and/or other image processing techniques described above. For example, the position of the end effector may be adjusted in a feedback loop based on image processing analysis until image processing determines that the end effector is positioned properly. For example, the end effector may be adjusted until the end effector is in a mating position (e.g., a position at which a sealing surface of a gladhand clamped by the end effector aligns with a sealing surface of a gladhand connection site). The mating position may also consider a rotational orientation of the end effector and/or clamped gladhand relative to the mating surface of the gladhand connection site. For example, the flange(s) of the clamped gladhand may be intentionally misaligned with flange(s) of the gladhand connection site such that rotation of the gladhand will cause coupling of the gladhand to the gladhand connection site.

At operation 2206, a gladhand is caused to be rotated by the end effector. After positioning the end effector (and gladhand clamped by the end effector) in a mating position, the end effector may rotate the gladhand to couple the clamped gladhand with the gladhand connection site at the current position. The rotation of the gladhand may result in pressurized coupling of the gladhand at the gladhand connection site on the trailer.

At operation 2208, the end effector is repositioned. After rotating the gladhand to couple the gladhand at the gladhand connection site, the end effector may release the clamped gladhand by transitioning to an unclamped configuration. The unclamped configuration may increase a distance between a top clamp and a bottom clamp of the end effector to release (e.g., decouple) the gladhand. The end effector may be repositioned (e.g., rotated or moved about three-dimensional space) by a motor of the end effector and/or by a linear actuator assembly. In an example, after the gladhand is coupled to the trailer, the end effector may be moved to a resting position, such as a position with preset coordinates of the end effector. The repositioning of the end effector may not use image processing techniques.

Decoupling of the gladhand from the trailer may perform similar steps as coupling the gladhand to the trailer. For example, a gladhand coupled to a trailer may be identified and localized. The end effector may then be positioned based on the identified and localized gladhand. For example, the end effector may be moved (e.g., by a linear actuator assembly) and/or oriented so that the end effector can couple to the gladhand. The end effector may then rotate the gladhand to decouple the gladhand from the trailer. Image processing techniques described herein may be used to determine at what position and orientation of the end effector that the gladhand is no longer coupled to the trailer. After decoupling the gladhand, the end effector may be repositioned (e.g., while clamping the gladhand). In an example, the end effector may perform operations similar to those described above to couple the gladhand to the truck, rather than the trailer (e.g., if the trailer has reached its destination).

This disclosure describes some embodiments of the present technology with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art.

Further, as used herein and in the claims, the phrase "at least one of element A, element B, or element C" is intended to convey any of: element A, element B, element C, elements A and B, elements A and C, elements B and C, and elements A, B, and C. In addition, one having skill in the art will understand the degree to which terms such as "about" or "substantially" convey in light of the measurements techniques utilized herein. To the extent such terms may not be clearly defined or understood by one having skill in the art, the term "about" shall mean plus or minus ten percent.

Although specific embodiments are described herein, the scope of the technology is not limited to those specific embodiments. One skilled in the art will recognize other embodiments or improvements that are within the scope and spirit of the present technology. In addition, one having skill in the art will recognize that the various examples and embodiments described herein may be combined with one another. Therefore, the specific structure, acts, or media are disclosed only as illustrative embodiments. The scope of the technology is defined by the following claims and any equivalents therein.

What is claimed is:

1. A method for automating a gladhand coupling between a vehicle and a trailer, the method comprising:
   identifying, by a processor, a trailer mating surface, based on at least one image;
   determining a mating position of the trailer mating surface, based on the at least one image;
   positioning an end effector based on the mating position, such that a gladhand mating surface of a gladhand coupled to the end effector is coupled to the trailer mating surface;
   rotating the end effector and a collar of the gladhand relative to the trailer mating surface and the gladhand mating surface, at the mating position without rotating the gladhand mating surface relative to the trailer mating surface;
   decoupling the gladhand from the end effector by opening a clamp of the end effector; and
   repositioning the end effector, wherein repositioning the end effector comprises moving and/or rotating the end effector to a resting position after the gladhand is coupled to the trailer.

2. The method of claim 1, wherein the gladhand comprises a mechanized gladhand including:
   a sealing surface;
   the collar;
   a plunger;
   a turret rotatable about the collar and the plunger; and
   a retention spring applying a threshold force on the plunger and the collar to limit rotation relative to each other.

3. The method of claim 2, wherein the mechanized gladhand further includes:
   a connector plate; and
   a detent plate.

4. The method of claim 3, wherein the connector plate and the detent plate are coupled to the turret to rotate with the turret.

5. The method of claim 2, wherein the turret is coupled to a hose and wherein the hose is coupled to a truck.

6. The method of claim 5, wherein the hose is fluidly coupled to a duct in the plunger and a port in the sealing surface.

7. The method of claim 6, wherein the duct in the plunger and the port in the sealing surface are concentric.

8. The method of claim 2, further comprising a collar sleeve, wherein the collar sleeve includes a connector plate and a detent plate.

9. The method of claim 2, wherein the plunger is retained to the turret on a rotational bearing.

10. The method of claim 1, wherein the at least one image includes a first image and wherein positioning the end effector is further based on a second image.

11. The method of claim 10, wherein the first image is obtained from a first camera and the second image is obtained from a second camera.

12. The method of claim 11, wherein the second camera is coupled to the end effector.

13. The method of claim 1, wherein positioning the end effector includes controlling at least one linear actuator coupled to the end effector.

14. The method of claim 1, wherein repositioning the end effector includes controlling at least one linear actuator coupled to the end effector.

15. The method of claim 1, wherein opening the clamp of the end effector includes moving a traveler along a drive shaft of the end effector.

16. A method for automating a gladhand decoupling between a vehicle and a trailer, the method comprising:
- identifying, by a processor, a gladhand with a gladhand mating surface coupled to a trailer mating surface, based on at least one image;
- determining a mating position of a gladhand coupled to the trailer mating surface, based on the at least one image;
- positioning an end effector based on the mating position, such that the end effector becomes coupled to the gladhand;
- rotating the end effector and a collar of the gladhand relative to the trailer mating surface and the gladhand mating surface, at the mating position without rotating the gladhand mating surface relative to the trailer mating surface; and
- repositioning the end effector and the gladhand, wherein repositioning the end effector and gladhand includes coupling the gladhand to the vehicle.

17. The method of claim 16, wherein determining the mating position is further based on machine learning.

18. The method of claim 16, wherein the at least one image includes a first image and wherein positioning the end effector is further based on a second image.

19. The method of claim 16, wherein rotating the end effector and the gladhand relative to the trailer mating surface decouples the gladhand mating surface from the trailer mating surface.

* * * * *